United States Patent [19]
Haneda et al.

[11] Patent Number: 5,539,731
[45] Date of Patent: Jul. 23, 1996

[54] ECHO CANCELLING METHOD AND APPARATUS USING FAST PROJECTION SCHEME

[75] Inventors: Yoichi Haneda; Shoji Makino, both of Tokyo; Masashi Tanaka; Yutaka Kaneda, both of Tokorozawa, all of Japan

[73] Assignee: Nippon Telegraph and Telephone Corporation, Tokyo, Japan

[21] Appl. No.: 385,989

[22] Filed: Feb. 9, 1995

[30] Foreign Application Priority Data

| Feb. 10, 1994 | [JP] | Japan | 6-016745 |
| Feb. 14, 1994 | [JP] | Japan | 6-017409 |
| Feb. 14, 1994 | [JP] | Japan | 6-017445 |
| May 17, 1994 | [JP] | Japan | 6-102418 |

[51] Int. Cl.$^6$ .................................................. H04M 9/08
[52] U.S. Cl. ........................................ 370/32.1; 379/410
[58] Field of Search .................... 370/32.1; 379/410, 379/406, 3, 407, 408, 409, 411; 375/232, 233, 243, 285; 381/63, 14, 71; 333/18, 28 R; 364/724.19

[56] References Cited

U.S. PATENT DOCUMENTS 5,351,291  9/1994  Menez et al. ........................ 370/32.1

Primary Examiner—Douglas W. Olms
Assistant Examiner—Dang Ton
Attorney, Agent, or Firm—Pollock, Vande Sande & Priddy

[57] ABSTRACT

In an echo cancelling method of a p-order fast projection algorithm which subtracts an estimated echo signal $\hat{y}(k)$ from a microphone output signal u(k) to obtain an error signal e(k), adaptively calculates a pre-filter coefficient β(k) from the auto-correlation of a received speech signal x(k) and the error signal, generating an intermediate variable z(k) updated by a coefficient s(k) obtained by smoothing the pre-filter coefficient, convolutes the received speech signal x(k) and the intermediate variable z(k), calculates the inner product of the auto-correlation of the received speech signal and the smoothed pre-filter coefficient s(k) and adding the inner product and the convoluted output to obtain the estimated echo signal, the magnitudes of the received speech signal x(k) and the error signal e(k) are compared and when the result of comparison satisfies a predetermined condition, a reset signal is generated to set the pre-filter coefficient β(k) to zero for at least a period of time p, thereby preventing the accuracy of estimated echo characteristics from lowering during double-talk or send single-talk.

40 Claims, 18 Drawing Sheets

ECHO CANCELLING METHOD AND APPARATUS USING FAST PROJECTION SCHEME

BACKGROUND OF THE INVENTION

The present invention relates generally to an echo cancelling method and apparatus for cancelling or suppressing an echo signal which causes howling and disturbs smooth conversation in a two-wire to four-wire switching system and a loudspeaking communication system. More particularly, the invention pertains to an acoustic echo canceller which adaptively estimates the output of an echo path by a fast projection algorithm.

In this specification, time will be represented by discrete time. For example, the amplitude of a signal x at a time instant k will be expressed by x(k). While the present invention is applicable to an adaptive estimation of the echo path output in an acoustic echo canceller and in adaptive sound field control, the invention will be described as being applied to an acoustic echo canceller in a loudspeaking communication system.

FIG. 1 is a schematic diagram of the loudspeaking communication system. Speech by a far-end speaker A is supplied to a loudspeaker 15 via a microphone 11, an amplifier 12, a transmission line 13a and a received signal amplifier 14 and the speech is reproduced from the loudspeaker 15 at the side of a near-end speaker B. On the other hand, speech by the speaker B is sent to the speaker A via a microphone 16, an amplifier 17, a transmission line 13b, a received signal amplifier 18 and a loudspeaker 19. This loudspeaking communication system does not require either speaker to hold the handset with his hand unlike conventional telephone communication systems, and hence enables him to communicate with the other party while working and permits the implementation of a natural face-to-face communication. Thus, this communication system is now widely used in TV conference systems, visual telephones, loudspeaking telephone sets and so forth.

On the other hand, the presence of an echo poses a problem in the loudspeaking communication system. In FIG. 1, the speech or voice of the far-end speaker A outputted from the loudspeaker 15 is received by the microphone 16 via an echo path EP and is reproduced at the near-end speaker A side via the amplifier 17, the transmission line 13b, the amplifier 18 and the loudspeaker 19. This is an echo phenomenon that the far-end speaker's speech is reproduced from the loudspeaker 19 at his side, and this phenomenon is usually referred to as an acoustic echo. This echo phenomenon disturbs smooth and comfortable communication in the loudspeaking communication system. Furthermore, the speech reproduced from the loudspeaker 19 is received by the microphone 11 to form a closed loop of signals. When the gain of the closed loop is larger than 1, what is called a howling phenomenon occurs, disabling communication. The same applies to the case where B is the near-end speaker and A the far-end speaker.

To overcome such problems of the loudspeaking communication system, a loss control device or echo canceller is used.

FIG. 2 schematically shows an example of a loss control device 20, in which the parts corresponding to those in FIG. 1 are identified by the same reference numerals. For the sake of brevity, the amplifiers are omitted and only the near-end speaker B side in FIG. 1 is depicted. A received speech signal x(k) from the transmission line 13a and the microphone output u(k) (k being a parameter indicating discrete time) from the microphone 16 are input into a loss control circuit 21, wherein a check is made to see if the near-end speaker side is in the send or receive condition, on the basis of the magnitudes of the input signals. Here, the microphone output u(k) is the sum of an echo signal y(k) having propagated over the echo path EP and a near-end speaker's speech signal n(k), that is, u(k)=y(k)+n(k). The above-mentioned check is made, for example, by calculating short time powers Px(k) and Pu(k) of the received speech signal x(k) and the microphone output u(k), predicting or estimating the power Pn(k) of the near-end speaker's speech signal n(k) and comparing the predicted value Pn(k) and the calculated short time power Px(k). Now, since there is no correlation between the signals x(k) and n(k), $$Pu(k)=Py(k)+Pn(k),$$

that is, $$Pn(k)=Pu(k)-Py(k)$$

holds. Letting the acoustic coupling of the echo path EP be represented by G, $$Py(k)=GPx(k)$$

holds and, therefore, the power Pn(k) of the near-end speaker's speech signal can be predicted or estimated as follows:

$$Pn(k)=Pu(k)-GPx(k).$$

When the powers Px(k) and Pn(k) bear the following relationship $$Pn(k)>Px(k),$$

that is, $$Pu(k)=GPx(k)>Px(k),$$

and in a rearranged form $$Pu(k)>(1+G)Px(k),$$

it is decided that the near-end speaker side is in the send condition. If the above relationship is not satisfied, it is decided that the near-end speaker side is in the receive condition. When the near-end speaker side is decided to be in the receive condition, the loss of a receiving side loss element 23 is made 0 dB and a loss $L_T$ is inserted in a transmitting side loss element 22 provided at the output side of the microphone 16. As the result of this, the echo signal y(k) having sneaked into the microphone 16 from the loudspeaker 15 is attenuated by the loss element 22, by which the closed loop gain is kept below 1 and the influence of the echo and the howling phenomenon is lessened accordingly. On the other hand, when the near-end speaker side is decided to be in the send condition, the loss of the transmitting side loss element 22 is made 0 (dB) and a loss $L_R$ is inserted in the receiving side loss element 23 provided at the input side of the loudspeaker 15. By this, a send signal, that is, the near-end speaker's speech signal received by the microphone 16 is transmitted without attenuation by the loss element 22. The insertion of the loss $L_R$ in the receiving side holds the closed loop gain smaller than 1, preventing the echo and the howling phenomenon from occurrence.

As described above, the use of the loss control device 20 lessens the influence of the echo and the howling phenomenon; in some cases, the losses $L_R$ and $L_T$ are fixed with a view to simplification of the system configuration. In such a situation, since the magnitude of the acoustic coupling G representing the degree of acoustic coupling of the echo path EP is unknown, the insertion losses are given large values (20 dB, for example) in anticipation of all possible conditions. When the insertion loss is in excess of 10 dB or so, however, a time lag by the decision of the send or receive condition of the near-end speaker side, for instance, will cause initial or word-end temporal clipping of speech, resulting in the degradation of the speech transmission quality.

As a solution to this problem, there has been proposed an adaptive loss control device which adaptively controls the loss in accordance with the acoustic coupling of the echo path under the actual condition of use.

FIG. 3 is a block diagram schematically showing the adaptive loss control device, which is identified generally by 20. The parts corresponding to those in FIG. 2 are denoted by the same reference numerals. An acoustic coupling estimation part 24 is provided. A signal $L_R x(k)$ from the loss element 23 supplied with the received speech signal x(k) and the microphone output u(k) from the microphone 16 are applied to the acoustic coupling estimation part 24. The acoustic coupling estimation part 24 estimates, on the basis of the levels of the input signals thereto, the acoustic coupling G of the echo path EP from the loudspeaker 15 to the microphone 16 and provides the estimated value to the loss control circuit 21. The loss control circuit 21 determines the insertion loss in accordance with the estimated acoustic coupling G. For instance, the estimated value G of the acoustic coupling can be calculated using short time powers $PL_R x(k)$ and Pu(k) of the input signals $L_R x(k)$ and u(k), as follows:

$$G = Pu(k)/PL_R x(k)$$

When the estimated value G of the acoustic coupling, which will hereinafter be referred to also as the acoustic coupling G, is greater than 1 (0 dB), the loss control circuit 21 calculates the loss such that the gain between signals x(k) and $L_T u(k)$ is smaller than 1. For example, when the estimated value G of the acoustic coupling of the echo path EP is 6 dB, the insertion loss is selected to be smaller than −6 dB so as to keep the open loop gain between the received speech signal x(k) and the send signal $L_T u(k)$ below 1 (0 dB). When the acoustic coupling G changes to 3 dB, the insertion loss is made below −3 dB. The insertion loss thus determined is set as the loss $L_R$ or $L_T$ in the loss element 22 or 23, depending upon the aforementioned decision as to whether the near-end speaker side is in the receive or send condition.

As mentioned above, the adaptive loss control device minimizes the deterioration of the speech transmission quality by determining the insertion loss in accordance with the magnitude of the acoustic coupling G of the echo path and inserting the loss in the loss element concerned. Since the estimated value G of the acoustic coupling is calculated using the short time powers of signals, however, it is difficult to detect its accurate value. Moreover, the use of the adaptive loss control device permits lessening the influence of the echo phenomenon, but when the acoustic coupling G of the echo path is large, the problem of the degradation of the speech transmission quality still remains unsolved. The echo canceller described below has recently been introduced as a new solution to such a problem.

FIG. 4 shows an example of a conventional echo canceller, which is identified generally by 30. In the echo canceller 30, a transfer function estimation part 31 estimates the impulse response h(k) of the echo path EP (or the echo path transfer characteristic) and provides the estimated value $\hat{h}(k)$ to an estimated echo path 32. Next, in the estimated echo path 32 the convolution of the estimated impulse response $\hat{h}(k)$ and the received speech signal x(k) is conducted to synthesize an estimated echo signal $\hat{y}(k)$. In a subtractor 33 the estimated echo signal $\hat{y}(k)$ is subtracted from the microphone output u(k)=y(k)+n(k) to the microphone 16 to obtain an error signal e(k). When the estimation of the impulse response of the echo path EP is correct, the echo signal y(k) and the estimated echo signal $\hat{y}(k)$ are nearly equal to each other, and as the result of the subtraction by the subtractor 33, the echo signal y(k) in the microphone output u(k) from the microphone 16 is cancelled.

The estimated echo path 32 needs to follow temporal variations of the transfer characteristic h(k) of the echo path EP. To perform this, the transfer function estimation part 31 estimates the impulse response h(k) of the echo path EP through the use of an adaptive algorithm. This estimation is made when the near-end speaker side is in the receive condition, that is, when the short time power Pn(k) is substantially zero and those Pu(k) and Py(k) can be regarded as being nearly equal to each other. Under the receive condition, the output from the subtractor 33, that is, the error signal e(k), can be regarded as a cancellation residual, $y(k) - \hat{y}(k)$, of the echo signal y(k). In the following description of the adaptive algorithm for the estimation of the impulse response, it is assumed that the near-end speaker side is in the receive condition. The adaptive algorithm is one that uses the received speech signal x(k) and the error signal e(k) to define the estimated value $\hat{h}(k)$ of the impulse response which minimizes the power of the error signal e(k); there are known such adaptive algorithms as LMS, NLMS and ES algorithms.

Next, a description will be given of typical ones of the known adaptive algorithms. When a digital FIR filter is used as the estimated echo path 32, the impulse response and filter coefficient of the filter match, and hence the estimated value $\hat{h}(k)$ of the impulse response h(k) of the echo path will hereinafter be referred to as a filter coefficient. In the adaptive algorithm the filter coefficient $\hat{h}(k)$ is estimated in time sequence. Let it be assumed that the filter coefficient $\hat{h}(k+1)$ at time k+1 is obtained by adjusting the filter coefficient $\hat{h}(k)$ at time k as follows:

$$\hat{h}(k+1) = \hat{h}(k) + \alpha \delta(k) \quad (1)$$

where $$\hat{h}(k) = [\hat{h}_1(k), \hat{h}_2(k), \ldots, \hat{h}_L(k)]^T:$$

filter coefficient (a vector representing the impulse response of the estimated echo path 32 at time k), δ(k): vector indicating the direction of adjustment of the coefficient, α: step size (a parameter of the scalar quantity representing the magnitude of the adjustment of the coefficient), L: number of taps (the number of filter coefficients), T: transposition of the vector, k: discrete time.

The vector δ(k) differs with algorithms. In the LMS algorithm, $$\delta(k) = e(k) x(k) \quad (2)$$

In the NLMS algorithm, $$\delta(k)=e(k)x(k)/[x(k)^T x(k)] \quad (3)$$

where $$e(k)=u(k)-\hat{y}(k)=y(k)+n(k)-\hat{y}(k): \text{ error signal}$$

(where n(k)=0), $$\hat{y}(k) = \hat{h}(k)^T x(k) = \sum_{i=1}^{L} x(k-i+1)\hat{h}_i(k) \quad (4)$$

$x(k)=[x(k), x(k-1), \ldots, x(k-L+1)]^T$: vector of the received speech signal.

Here, the state in which the characteristic of the estimated echo path 32 is close to that of the true echo path EP and the estimated echo signal $\hat{y}(k)$ has become nearly equal to the echo signal y(k) will be called a converged state.

In various adaptive algorithms the step size parameter $\alpha$ is usually set to 1. The step size parameter $\alpha$ is a quantity that exerts influence on the convergence; when it is 1, the convergence speed is maximum and when it is set to a value smaller than 1, the convergence speed decreases but the net error value becomes smaller than in the former case. On this account, there has also been proposed a variable step size parameter type adaptive algorithm which initially sets the step size parameter $\alpha$ to 1 and then decreases it as the convergence proceeds to some extent. In such an algorithm, it is necessary to correctly decide or judge the state or degree of convergence.

Next, a description will be given of another adaptive algorithm which is a projection algorithm proposed in Ozeki and Umeda, "An adaptive filtering algorithm using an orthogonal projection to an affine surface and its properties," Journal of the Institute of Electronics, Information and Communication Engineers of Japan (A), J67-A, pp. 126–132, ('84-2). The projection algorithm involves computational complexity more than that of the NLMS algorithm but has excellent convergence characteristics for speech input signals. In a p-order projection algorithm, the filter coefficient adjustment vector $\delta(k)$ is determined so that the following p (where p is a predetermined integer which satisfies $2 \leq p < L$, and hence the tap number L is an integer equal to or greater than 3) simultaneous equations are satisfied.

$$y(k)=[x(k), x(k-1), \ldots, x(k-L+1)][\hat{h}(k)+\delta(k)] \quad (5)$$

$$y(k-1)=[x(k-1), x(k-2), \ldots, x(k-L)][\hat{h}(k)+\delta(k)]$$

$$y(k-p+1)=[x(-p+1), x(k-p), \ldots, x(k-p-L+2)][\hat{h}(k)+\delta(k)]$$

That is, the filter coefficient adjustment vector $\delta(k)$ is determined so that a filter coefficient vector $\hat{h}(k+1)$ updated by an equation setting $\alpha=1$ in Eq. (1) reduces errors to zero for input signals at times k, k−1, ..., k−p+1. Thus, if the input signals are similar, it is expected that errors decrease at other times as well.

FIG. 5 illustrates in block form an echo canceller which applies the conventional projection scheme to the transfer function estimation part 31 in FIG. 4. In this example, the transfer function estimation part 31 comprises an auto-correlation calculating part 31A, a $\beta$ calculating part 31B and a filter coefficient updating part 31C. In the conventional projection scheme, the filter coefficient is updated by the following equation.

$$\hat{h}(k+1)=\hat{h}(k)+\alpha[\beta_1(k)x(k)+\beta_2(k)x(k-1)+\ldots+\beta_p(k)x(k-p+1)] \quad (6)$$

$$x(k)=[x(k), x(k-1), \ldots, x(k-L+1)]^T \quad (7)$$

where $\beta_1(k), \beta_2(k), \ldots, \beta_p(k)$ are pre-filter coefficients, which are calculated as solutions of the following simultaneous equations in the $\beta$ calculating part 31B.

$$\beta(k)^T R(k)=[e(k), (1-\alpha)e(k-1), \ldots, (1-\alpha)^{p-1}e(k-p+1)] \quad (8)$$

where $\beta(k)=[\beta_1(k), \beta_2(k), \ldots, \beta_p(k)]^T$ and R(k) is an auto-correlation matrix of the input signal x(k), an element $r_{i,j}(k)$ of the auto-correlation matrix R(k) with i+1 rows and j+1 columns (where $0 \leq i \leq p-1$ and $0 \leq j \leq p-1$) being defined by the following equation.

$$r_{i,j}(k)=r_{j,i}(k)=x(k-1)^T x(k-j) \quad (9)$$

The updating of the element $r_{i,j}(k)$ (to obtain $r_{i,j}(k+1)$ from $r_{i,j}(k)$) is carried out in the auto-correlation calculating part 31A by the following equation.

When $i \neq 0$ and $j \neq 0$: $r_{i,j}(k+1)=r_{i-1,j-1}(k)$

In other cases:

$$r_{0,j}(k+1)=r_{0,j}(k)+x(k+1)x(k+1-j)-x(k-L+1)x(k-j-L+1) \quad (10)$$

The procedure for updating the filter coefficient $\hat{h}(k)$ once by the conventional projection scheme is as follows:

Step S1: Calculate the auto-correlation $r_{i,j}$ of the input signal x(k) by Eq. (10) in the auto-correlation calculating part 31A.

Step S2: Conduct the convolution of the input signal x(k) and the filter coefficient $\hat{h}(k)$ by Eq. (4) in the estimated echo path (a convolution part) 32 to obtain an estimated value (the estimated echo signal $\hat{y}(k)$) of the output y(k) from the echo path EP.

Step S3: Subtract the estimated output value $\hat{y}(k)$ of the estimated echo path 32 from the microphone output u(k) from the microphone 16 by the subtractor 33 to obtain the estimated error e(k), n(k) being set to 0 in this case.

Step S4: Calculate the pre-filter coefficient $\beta(k)$ by Eq. (8) in the $\beta$ calculating part 31B, using the estimated error e(k) and the auto-correlation matrix R(k).

Step S5: Update the filter coefficient $\hat{h}(k)$ by Eq. (6) in the filter coefficient updating part 31C, using the pre-filter coefficient $\beta(k)$ and the input signal x(k).

Every updating of the filter coefficient $\hat{h}(k)$ requires repeating a multiplication-addition process about (p+1)L times. An acoustic echo canceller which utilizes a fast projection scheme using an intermediate variable with a view to reducing the total amount of multiplication-addition processing is disclosed in U.S. patent application Ser. No. 08/278,503 filed in the names of the inventors of this application. FIG. 6 depicts the transfer function estimation part, denoted generally by 310, in which the filter coefficient updating part 31C in FIG. 5 is replaced with an s updating part 31D and an intermediate variable updating part 31E and a multiplier 31F is used. The pre-filter coefficient $\beta(k)$ is smoothed in the s updating part 31D and converted in the intermediate variable updating part 31E to an intermediate variable z(k), which is provided to a convolution part 32A for convolution with the input signal x(k). The auto-correlation coefficient $r_{0,i}(k)$ from the auto-correlation calculating part 31A and the smoothed pre-filter coefficient $s_i(k)$ from the s updating part 31D are multiplied by the multiplier 31F. The multiplied output and the output from the convolution part 32A are added together by an adder 32B and the added output is provided as the estimated echo signal $\hat{y}(k)$. Thus, the convolution part 32A and the adder 32B equivalently form the estimated echo path 32 which simulates the echo path EP. This fast projection scheme is an algorithm which reduces to around 2L the required number of times the multiplication-addition processing is carried out, as described below. In the fast projection algorithm, the intermediate variable $z(k+1)$, which is given by the following equation, is introduced in place of the filter coefficient $\hat{h}(k+1)$.

$$z(k+1)=\hat{h}(k+1)-\alpha[s_1(k)x(k)+s_2(k)x(k-1)+\ldots+s_{p-1}(k)x(k-p+2)] \quad (11)$$

where $$z(k)=[z_1(k), z_2(k), \ldots, z_L(k)]^T$$

and $$s_i(k)=s_{i-1}(k-1)+\beta_i(k), s_0(k)=0 \ (i=1, 2, \ldots, p) \quad (12)$$

This $s_i(k)$ is called a smoothed pre-filter coefficient, which is calculated in the s updating part 31D. Substituting the intermediate variable $z(k)$ for the filter coefficient $\hat{h}(k)$ in Eq. (6), we have the following recursion formula of the former $z(k)$.

$$z(k+1)=z(k)+\alpha s_p(k)x(k-p+1) \quad (13)$$

The time updating of this intermediate variable $z(k)$ is performed in the intermediate variable updating part 31E. From Eqs. (4) and (11), the estimated value $\hat{y}(k)$ of the response of the echo path EP becomes as follows:

$$\hat{y}(k) = \hat{h}(k)^T x(k) = z(k)^T x(k) + \alpha \sum_{i=1}^{p-1} s_i(k-1)x(k-i)^T x(k) \quad (14)$$

Using the auto-correlation value, it can be described as follows:

$$\hat{y}(k) = z(k)^T x(k) + \alpha \sum_{i=1}^{p-1} s_i(k-1)r_{0,i}(k) \quad (15)$$

The first term on the right side of Eq. (15) is the output from the convolution part 32A and the sum of inner products of the second and subsequent terms is the output from the multiplier 31F.

The filter coefficient updating procedure in this fast projection algorithm is as follows:

Step S1: Calculate the auto-correlation $r_{i,j}$ of the input signal $x(k)$ by Eq. (10) in the auto-correlation calculating part 31A.

Step S2: Conduct a convolution of the input signal $x(k)$ and the intermediate variable $z(k)$ in the convolution part 32A, obtain the sum of the inner products of the smoothed pre-filter coefficient $s_i(k)$ and the auto-correlation $r_{0,i}$ on the right side of Eq. (15) by the multiplier 31F and obtain the sum of the convoluted output and the sum of the inner products as the estimated output value $\hat{y}(k)$ of the echo path EP by the adder 32B. That is, perform the calculation of Eq. (15).

Step S3: Calculate the estimation error $e(k)=u(k)-\hat{y}(k)$ by Eq. (1) in the subtractor 33, with $n(k)$ assumed to be zero.

Step S4: Calculate the pre-filter coefficient $\beta(k)$ by Eq. (8) in the $\beta$ calculating part 31B.

Step S5: Update the smoothed pre-filter coefficient $s_i(k)$ by Eq. (12) in the s updating part 31D on the basis of the pre-filter coefficient $\beta(k)$.

Step S6: Update the intermediate variable $z(k)$ in the intermediate variable updating part 31E, using the updated smoothed pre-filter coefficient $s_i(k)$ and the input signal $x(k)$.

Step S7: Repeat the sequence of steps S1 through S6.

As described above, according to the fast projection algorithm proposed in the aforementioned U.S. patent application, the transfer function (i.e. the filter coefficient) $\hat{h}(k)$ is not directly updated but instead the intermediate variable $z(k)$ is updated to calculate the estimated output $\hat{y}(k)$ by Eq. (15). In this instance, the total amount of multiplication-addition processing necessary for one update is about 2 L when p<<L. This is far smaller than the amount of multiplication-addition processing, (p+1)L, needed in the projection algorithm described above in respect of FIG. 5.

Incidentally, there are two reasons for a great increase of the estimated error in the echo canceller. One is a change of the echo path EP and the other is an increase of noise (the near-end speaker's speech) $n(k)$. In the case of the former, the updating of the filter coefficient needs only to be continued, but in the case of the latter, if the updating of the filter coefficient $\hat{h}(k)$ is continued using $y(k)+n(k)-\hat{y}(k)$ as the estimation error $e(k)$, the filter coefficient is updated regarding the near-end speaker's speech signal $n(k)$ as the error $e(k)$—this causes a decrease in the accuracy of estimation of the transfer function $h(k)$ of the echo path EP. To avoid this, it is necessary to detect a mixed received speech signal $x(k)$ and near-end speaker's speech signal $n(k)$ state (i.e. double-talking) and to interrupt the updating of the filter coefficient during double-talking. As a solution to the problem for double-talking, an FG/BG (Fore Ground/Back Ground) system is known, for example, in Ochiai et al., "Echo Canceller with Two Echo Path Models," IEEE TRAN. ON COMM. VOL. COM-25, NO. 6, June 1977, pp. 598–595 and U.S. Pat. No. 4,757,527 (Jul. 12, 1988) issued to Beniston et al.

FIG. 7 is a schematic diagram for explaining an echo canceller embodying the conventional FG/BG system, which has, in addition to the FIG. 4 configuration, an estimated echo path 41 for performing the convolution of the input signal $x(k)$. The two estimated echo paths 32 and 41 are called a BG side estimated echo path and an FG side estimated echo path, respectively. The difference between an estimated value $\hat{y}_f(k)$ of the output from the estimated echo path 41 and the microphone output $u(k)$ is detected by a subtractor 42, and an estimated error signal $e_f(k)$ by the subtraction is provided to the transmission line 13b in place of an error signal $e_b(k)$ and to a transfer logic part 43 as well. A filter coefficient $\hat{h}_b(k)$ of the BG side estimated echo path 32 is updated with the lapse of time k on the basis of the result of estimation in the transfer function estimation part 31, whereas a filter coefficient $\hat{h}_f(k)$ of the FG side estimated echo path 41 is initialized to a proper value and is updated only when a predetermined condition is satisfied in the transfer logic part 43. The transfer logic part 43 determines if the filter coefficient $\hat{h}_b(k)$ of the estimated echo path 32 faithfully represents the true echo path EP, depending upon whether the predetermined condition is satisfied on the basis of the magnitudes of powers of the error signals $e_b(k)$ and $e_f(k)$, the input signal $x(k)$ and the microphone output $u(k)$. When judging that the predetermined condition is satisfied, the transfer decision logic part 43 turns ON a switch 44, through which the latest filter coefficient $\hat{h}_b(k)$ set in the estimated echo path 32 by the transfer function estimation part 31 is provided as the filter coefficient $\hat{h}_f(k)$ of the estimated echo path 41.

In general, it is performed by comparing the powers of the microphone output $u(k)$, the error signals $e_b(k)$ and $e_f(k)$ and the received speech signal $x(k)$ to determine if the characteristics of the BG side estimated echo path 32 has approximated the characteristics of the true echo path EP. The power mentioned herein is a time integration value of a signal, and in the case of handling a discrete signal, the power $Px(k)$ of the received speech signal $x(k)$, for instance, is calculated as follows:

$$Px(k) = \sum_{i=0}^{d-1} x^2(k-i)$$

where d is a predetermined integral action time. The powers of other signals are similarly calculated. The aforementioned transfer of the filter coefficient takes place when the three conditions listed below are simultaneously satisfied.

(a) In an input decision part 43A the power of the input signal x(k) is larger than a preset threshold value $P_{th}$ (the received speech signal is present):

$Px(k) > P_{th}$ (b) In a power comparison part 43B the power of the error signal $e_b(k)$ is smaller than the power of the microphone output u(k) in excess of a certain value:

$Pe_b(k) < C \cdot Pu(k)$, where C is a positive constant smaller than 1.

(c) In an error comparison part 43C the power of the BG side error signal $e_b(k)$ is smaller than the power of the FG side error signal $e_f(k)$: $Pe_b(k) < Pe_f(k)$ In this instance, since it is considered that the estimated coefficient $\hat{h}_b(k)$ closely simulates the impulse response h(k) of the actual echo path EP more than does the FG side echo path coefficient $\hat{h}_f(k)$, the coefficient $\hat{h}_b(k)$ of the BG side estimated echo path 32 is transferred to the FG side estimated echo path 41. The coefficient $\hat{h}_f(k)$ of the FG side estimated echo path 41 is updated only when the above-mentioned three conditions are satisfied.

Consequently, when the echo path changes, the residuals $e_b(k)$ and $e_f(k)$ increase, after which the power of the signal $e_b(k)$ is reduced smaller than that of the signal $e_f(k)$ by the adaptive estimation of the impulse response (the filter coefficient) in the transfer function estimation part 31. As the result of this, the switch 44 is turned ON, through which the filter coefficient $\hat{h}_b(k)$ is transferred. On the other hand, when the level of noise (the near-end speaker's speech) n(k) becomes high, the estimation error of the filter coefficient $\hat{h}_b(k)$ of the BG side estimated echo path 32 increases and the power of the signal $e_b(k)$ becomes larger than that of the signal $e_f(k)$, hence the filter coefficient is not transferred. In this case, there is held in the estimated echo path 41 the filter coefficient $\hat{h}_f(k)$ set prior to the increase in the level of the near-end speaker's speech signal n(k) and, therefore, if the echo path EP has undergone any change, the echo signal y(k) can be cancelled out by the estimated echo signal $\hat{y}_f(k)$ in the subtractor 42. In the system of FIG. 7, the output error signal $e_f(k)$ from the subtractor 42 is sent to a remote terminal over the transmission line 13b.

The projection schemes also suffer the deterioration of the accuracy of estimation of the transfer function h(k) of the echo path EP if the updating of the filter coefficient is continued when the level of noise (the near-end speaker's speech signal) n(k) is higher than the response y(k) of the echo path EP. To avoid this, it is necessary to stop the adaptive operation when the level of the noise n(k) increases high. As described later, however, when the echo canceller utilizing the fast projection algorithm, which involves less computational complexity as proposed in the aforementioned U.S. patent application, is so configured simply as to stop the updating the intermediate variable, the computational complexity for calculating the estimated echo signal $\hat{y}(k)$ increases, while at the same time the storage capacity also increases.

SUMMARY OF THE INVENTION

It is therefore an object of the present invention to provide an echo cancelling method and an echo canceller which utilize a fast projection scheme which is used to calculate the impulse response of an estimated echo path and permits the calculation of the estimated echo signal $\hat{y}(k)$ with less computational complexity even if the updating of the intermediate variable is interrupted when the send speech or near-end speaker's speech increases.

According to the present invention, the echo cancelling method and the echo canceller employ the p-order fast projection algorithm whereby the pre-filter coefficient β(k) is adaptively calculated from the auto-correlation of the received speech signal x(k) and the error signal e(k), the intermediate variable z(k) updated using the smoothed pre-filter coefficient s(k) is generated, the convolution of the intermediate variable z(k) and the received speech signal x(k) is carried out in the convolution part, the inner product sum of the auto-correlation of the received speech signal and the smoothed pre-filter coefficient s(k) is calculated for addition to the convoluted output to obtain the estimated echo signal $\hat{y}(k)$. The magnitudes of the received speech signal x(k) and the error signal e(k) are compared by update interruption decision logic means, and when the result of the comparison satisfies a predetermined condition, a reset signal is outputted from the update interrupt decision logic means to set the pre-filter coefficient β(k) to zero for a period of time p at the shortest.

DESCRIPTION OF THE PREFERRED EMBODIMENTS

Figure 4:
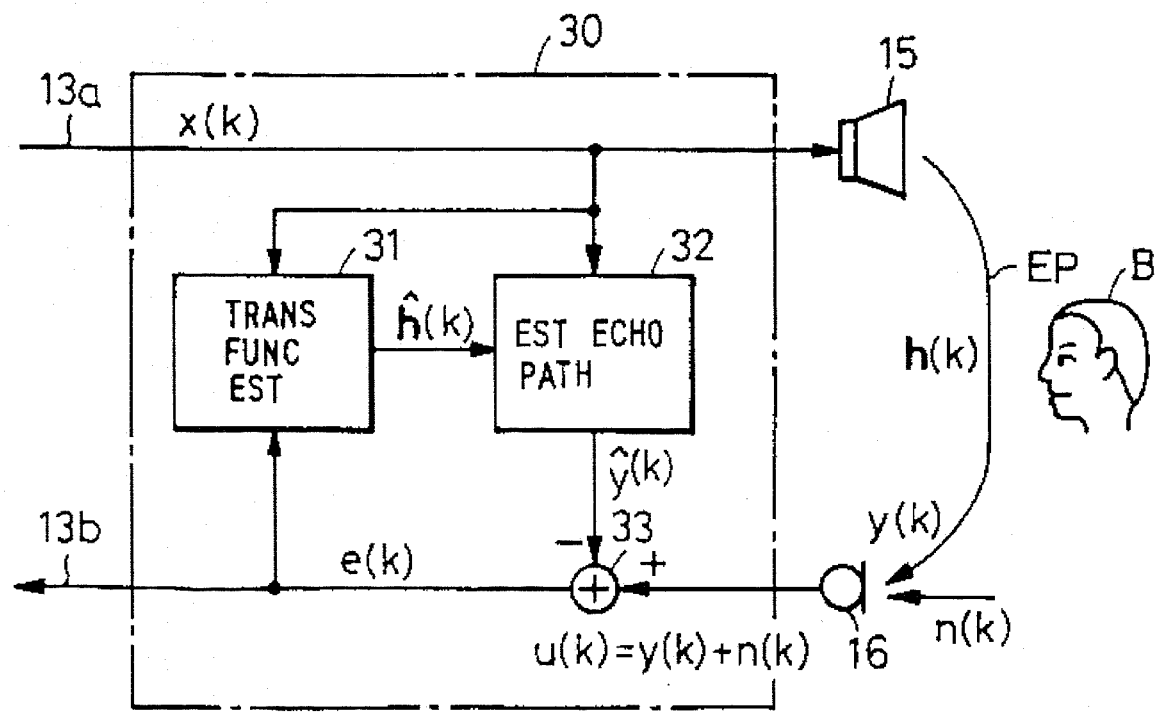
FIG. 4 is a block diagram showing a conventional echo canceller.
Figure 5:
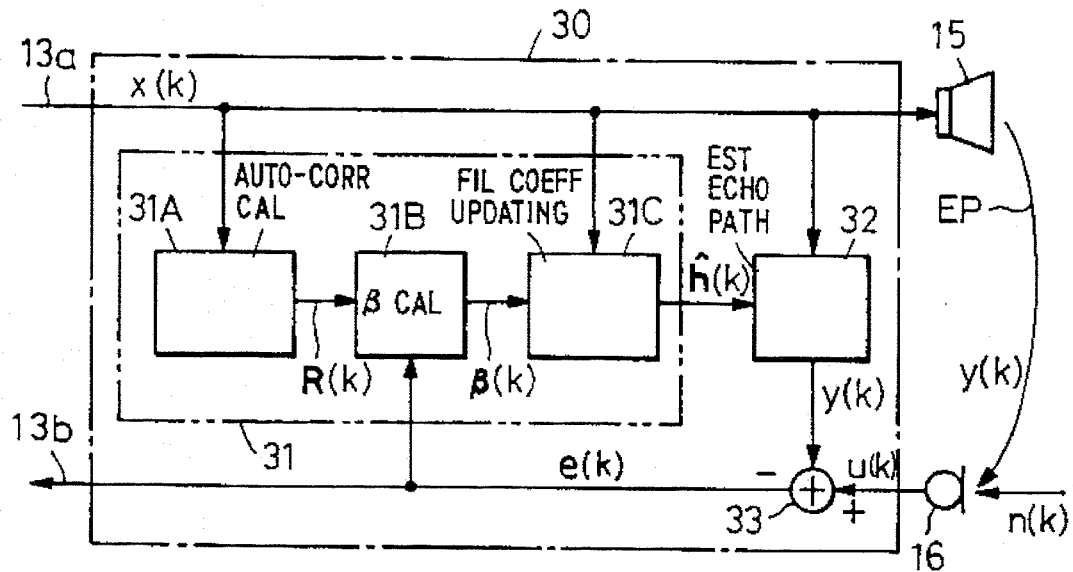
FIG. 5 is a block diagram showing an echo canceller using a conventional projection algorithm.

In the echo canceller of FIG. 4 or 5, if the updating of the filter coefficient is stopped after time $k_s$ when the double-talk was detected, it is desirable that an estimated echo signal $\hat{y}(k_s+m)$, which is a subsequent estimated output, be given as follows:

$$\hat{y}(k_s+m) = \hat{h}(k_s)^T x(k_s+m) \quad (16)$$

where $m \geq 0$.

Figure 6:
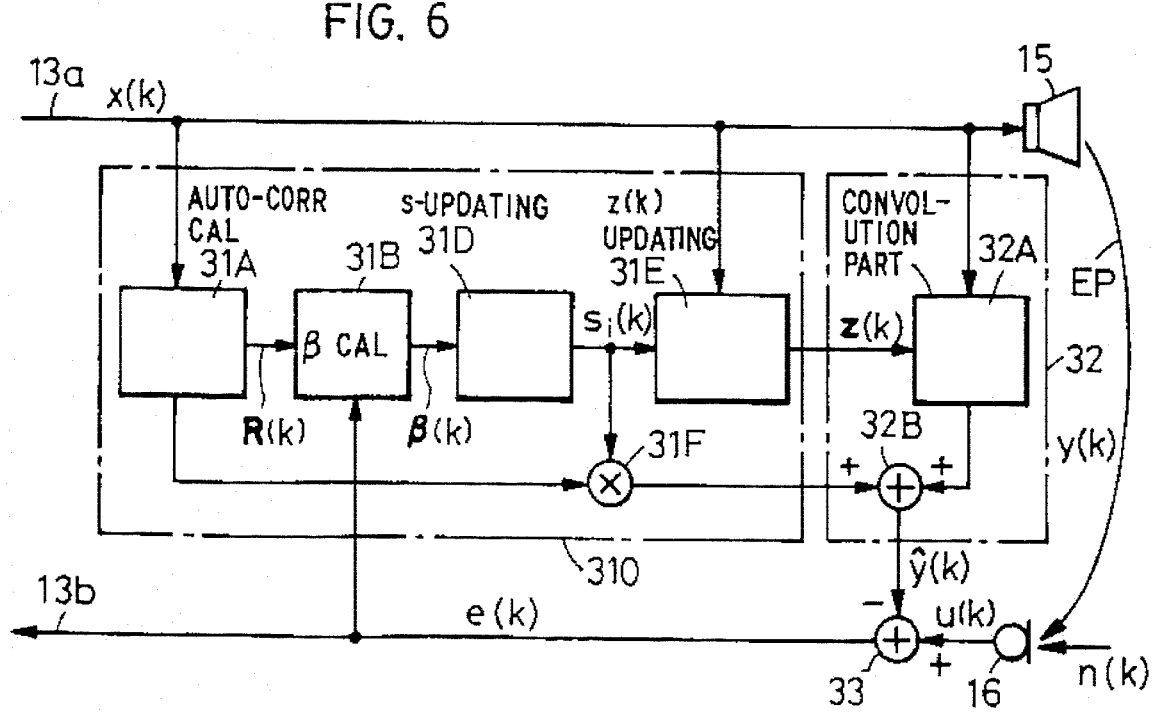
FIG. 6 is a block diagram of an echo canceller using a fast projection algorithm on which the present invention is based.

On the other hand, the fast projection algorithm of FIG. 6, on which the present invention is based, updates the intermediate variable instead of updating the filter coefficient as referred to previously. In view of this, it is possible to employ a configuration shown in FIG. 8 for an echo canceller of the fast projection scheme which has a filter coefficient update interruption capability. That is, an update interruption decision logic part 51 is added to the configuration of FIG. 6. The update interruption decision logic part 51 is supplied with the received speech signal $x(k)$ and the estimated error signal $e(k)$, for instance; when the received speech signal $x(k)$ is zero or $Px(k)<Pe(k)$, it is judged that the near-end speaker side is in a send single-talk or double-talk condition, the logic part 51 sends an update interruption signal INT to the intermediate variable updating part 31E during the send single-talk or double-talk condition. When these conditions are no longer satisfied, the outputting of the update interruption signal INT is stopped. The conditions for the update interruption decision logic part 51 may be defined by other methods.

When the calculation of Eq. (13) for updating the intermediate variable $z(k)$ after time $k_s$, the estimated value $\hat{y}(k_s+m)$ of the output $y(k_s+m)$ from the echo path at A time $k_s+m$ (where $m \geq 0$) can be expressed by the following equation as is the case of Eq. (16).

$$\hat{y}(k_s + m) = z(k_s)^T x(k_s + m) + \alpha \sum_{i=1}^{p-1} s_i(k_s - 1) r_{0,m+i}(k_s + m) \quad (17)$$

The auto-correlation value $r_{0,m+i}(k_s+m)$ in the above equation is updated for $i=1, 2, \ldots, p-2$ through the use of the following equation.

$$r_{0,m+1+i}(k_s+m+1) = r_{0,m+1+i}(k_s+m) + x(k_s-i)x(k_2+m+1) - x(k_s-i-L)x(k_s+m-L+1) \quad (18)$$

The number of multiplication-additions for this update is $2(p-2)$. With $i=p-1$, the auto-correlation value $r_{0,m+p}(k_s+m)$ is not calculated since the value m is larger by 1 than that at the preceding time. Consequently, the auto-correlation value needs to be calculated by the following equation on the basis of the definition given by Eq. (9).

$$r_{0,m+p}(k_s+m+1) = x(k_s+m+1)^T x(k_s-p+1) \quad (19)$$

Figure 8:
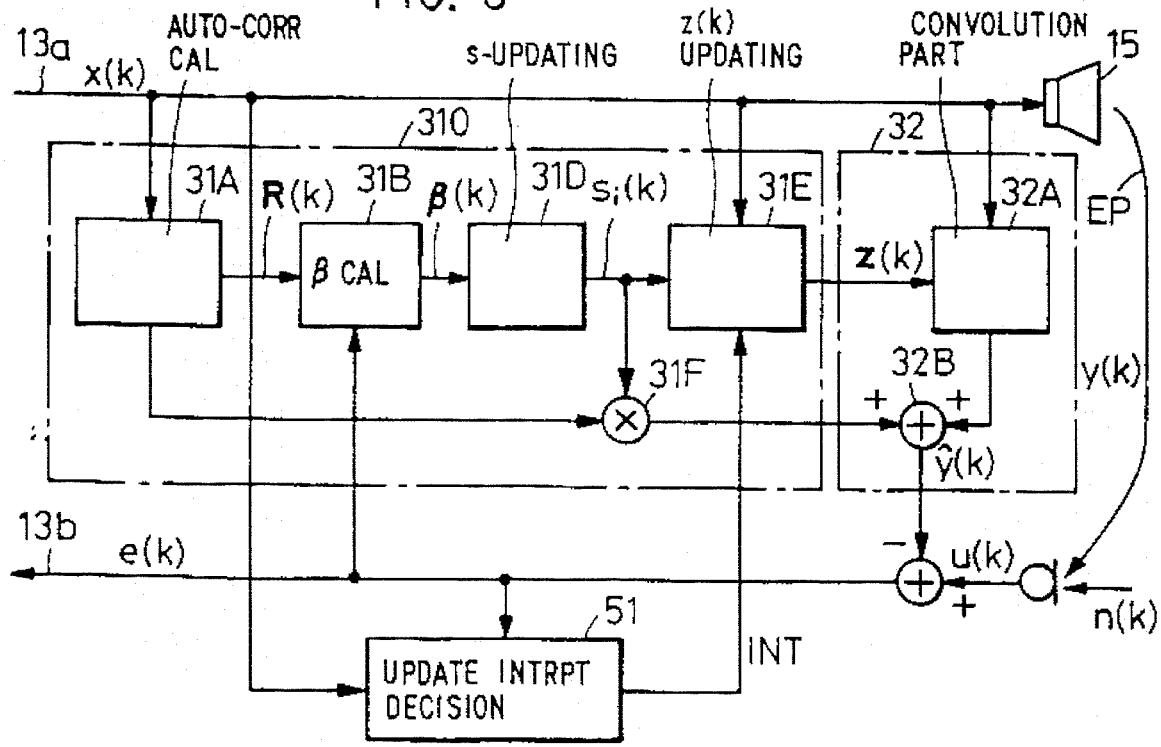
FIG. 8 is a block diagram showing a modified form of the FIG. 6 echo canceller which is provided with an update interruption capability.
Figure 9:
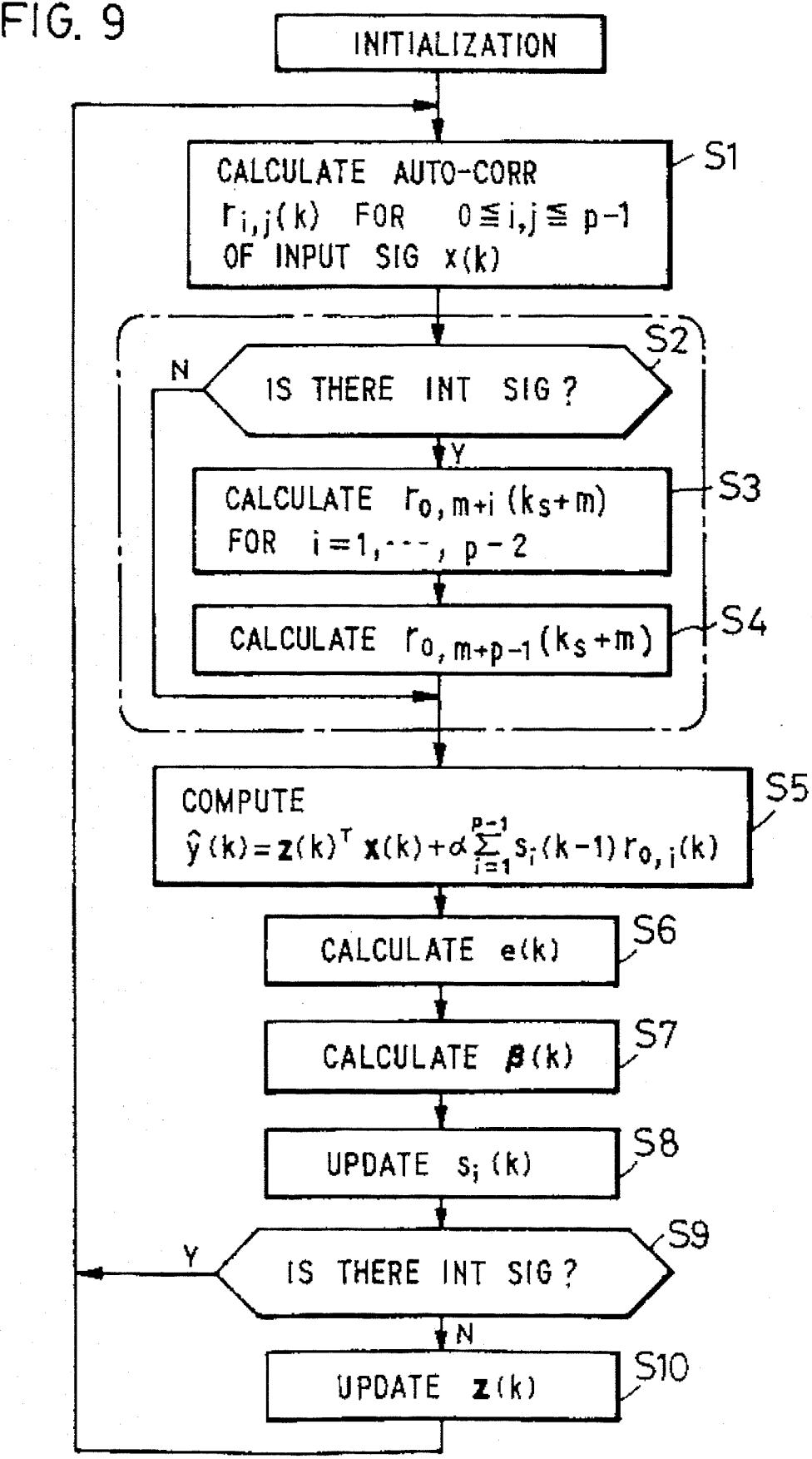
FIG. 9 is a flowchart for explaining the operation of the echo canceller depicted in FIG. 8.

To calculate the above equation, it is necessary to perform the multiplication-addition L times. Thus, the calculation of Eqs. (18) and (19) calls for about $L+2p$ newly additional operations. Furthermore, it is also necessary to hold the received speech signals $x(k_s-1), \ldots, x(k_s-p-L+2)$ and hence provide $L+p-2$ extra storage areas. The intermediate variable updating procedure in the configuration of FIG. 8 is such as shown in FIG. 9.

The procedure begins with step S1 of calculating the auto-correlation $r_{i,j}(k)$ of the input signal $x(k)$, followed by step S2 of making a check to see if the update interruption signal INT is being provided from the update interruption decision logic part 51. If not, the process proceeds to step S5 of calculating the estimated value $\hat{y}(k)$ of the output from the echo path as in step S6 described previously with respect to FIG. 6. If the update interruption signal INT is detected, the auto-correlation value $r_{0,m+i}(k_s+m)$ is calculated by the auto-correlation calculating part 31A through the use of Eq. (18) in step S3 and the auto-correlation value $r_{0,m+p}(k_s+m+1)$ is calculated using Eq. (19) in step S4, after which the process goes to step S5. After this, as is the case with the FIG. 6 example, the estimated error $e(k)$ is calculated in step S6, then the pre-filter coefficient $\beta(k)$ is calculated in step S7 and the smoothed pre-filter coefficient $s_i(k)$ is updated in step S8. Next, a check is made again to determine if the update interruption signal INT is present, and if not, the intermediate variable $z(k)$ is updated using Eq. (13) in step S10 and the process goes back to step S1. If the update interruption signal INT is present, the process returns to step S1 without updating the intermediate variable $z(k)$.

As described above, according to the fast projection algorithm, the computational complexity can remarkably be reduced more than by the conventional projection algorithms, but in the case of outputting the update interruption signal INT to avoid the influence of the near-end speaker's speech signal $n(k)$, the computational complexity increases accordingly and extra storage areas are needed. In view of this, the present invention implements an echo output estimating method by the fast projection scheme which obtains $\hat{y}(k_s+m)$ (where $m \geq 0$) without calculating the auto-correlation $r_{0,m+i}(k_s+m)$, requires less computational complexity and fewer storage areas and avoids the influence of the near-end speaker's speech signal.

Once the update interruption signal INT is generated at time $k_s$, that is, once the adaptive algorithm is interrupted at time $k_s$, the pre-filter coefficient $\beta_i(k)$ is held at the following value until the adaptive algorithm is resumed.

$$\beta_i(k) = 0 \text{ for } i=1, \ldots, p \quad (20)$$

By this, the output from the adder 32B in FIG. 6 matches the estimated output $\hat{y}(k_s+m) = \hat{h}(k_s)^T x(k_s+m)$ ($m \geq 0$) given by Eq. (16). This will hereinafter be described in connection with the estimation of the output from the echo path at time $k_s+1$.

By setting the pre-filter coefficient to the value given by Eq. (20), Eq. (12) becomes $s_p(k_s)=s_{p-1}(k_s-1)$ at time $k_s$. The substitution of this into Eq. (13) gives $$z(k_s+1)=z(k_s)+\alpha s_{p-1}(k_s-1)x(k_s-p+1) \tag{21}$$

On the other hand, the estimated value $\hat{y}(k_s+1)$ of the output from the echo path at time $k_s+1$ can be calculated by Eq. (15), but by using Eq. (14) equal to Eq. (15), the estimated value can be written as follows:

$$\hat{y}(k_s+1) = z(k_s+1)^T x(k_s+1) + \alpha \sum_{i=1}^{p-1} s_i(k)x(k_s+1-i)^T x(k_s+1) \tag{22}$$

Furthermore, since $s_i(k_s)=s_{i-1}(k-1)$ from Eqs. (12) and (20), the right side of Eq. (22) becomes as follows:

$$z(k_s+1)^T x(k_s+1) + \alpha \sum_{i=1}^{p-1} s_{i-1}(k_s-1)x(k_s+1-i)^T x(k_s+1) = \tag{23}$$

$$z(k_s+1)^T x(k_s+1) + \alpha \sum_{i=2}^{p-1} s_{i-1}(k_s-1)x(k_s+1-i)^T x(k_s+1) =$$
(where $s_0 = 0$)

$$z(k_s+1)^T x(k_s+1) + \alpha \sum_{i=1}^{p-2} s_i(k_s-1)x(k_s-i)^T x(k_s+1)$$

Moreover, from an equation setting $k_s+1$ to k in Eq. (11) and Eq. (21) $z(k_s+1)$ becomes as follows:

$$z(k_s+1) = \hat{h}(k_s) = \alpha \sum_{i=1}^{p-2} s_i(k_s-1)x(k_s-i) \tag{24}$$

Substituting Eq. (24) into Eq. (23), Eq. (22) becomes as follows:

$$\hat{y}(k_s+1)=\hat{h}(k_s)^T x(k_s+1) \tag{25}$$

That is, under the condition of Eq. (20), the estimated value $y(k_s+1)$ of the output from the echo path can be calculated by Eq. (15) without involving the additional calculation of the auto-correlation values $r_{0,1+i}(k_s+1+1)$ and $r_{0,1+p}(k_s+1+1)$ by Eqs. (18) and (19). Incidentally, $r_{0,i}(k+1)$ in Eq. (15) is always calculated in the auto-correlation calculating part 31A. After time $k_s+2$, too, the output from the adder 32B is made by Eq. (14) $\hat{h}(k_s)^T x(k_s+m)$, where $m \geq 1$. By setting the pre-filter coefficient $\beta_i$ to zero from the time $k_s$ of interruption of the adaptive algorithm to the time of its resumption as described above, it is possible to obtain the estimated value $\hat{y}(k_s+m)$ of the output from the echo path without involving the calculation of Eqs. (18) and (19) and hence without the necessity of the corresponding storage areas.

Substituting i=1, 2, ..., p in Eq. (12) at respective times $k_s+1$, $k_s+2$, ... and taking into account the relationship between the averaged pre-filter coefficient $s_0(k)$ and the pre-filter coefficient $\beta_i(k)=0$, where i=1, 2, ..., p, the averaged pre-filter coefficient is given by the following equation after time p subsequent to the interruption of the updating of the filter coefficient.

$$s_i(k_s+m)=0 \text{ for } i=1, \ldots, p, \text{ where } m \geq p \tag{26}$$

Hence, the output from the multiplier 31F in FIG. 6 always remains zero. From this, it is understood that the following equations hold:

$$z(k_s+m)^T x(k_s+m)=\hat{h}(k_s)^T x(k_s+m) \tag{27}$$

and consequently $$z(k_s+m)=\hat{h}(k_s), \text{ where } m \geq p \tag{28}$$

and that after time p following the generation of the update interruption signal INT the intermediate variable z becomes equal to the estimated coefficient h at time $k_s$ and is held at that value during the send single-talk or double-talk condition.

In FIG. 8, upon generation of the update interruption signal INT, the updating of the intermediate variable z(k) is suspended for the duration of the signal INT, but according to the present invention, for the duration of the update interruption signal INT the pre-filter coefficient β is reset to and held at zero and the updating of the smoothed pre-filter coefficient $s_i(k)$ by the s updating part 31D and the updating of the intermediate variable z(k) by the intermediate variable updating part 31E are continued following Eqs. (12) and (13), with the result that the calculation of Eqs. (18) and (19) becomes unnecessary.

Figure 10:
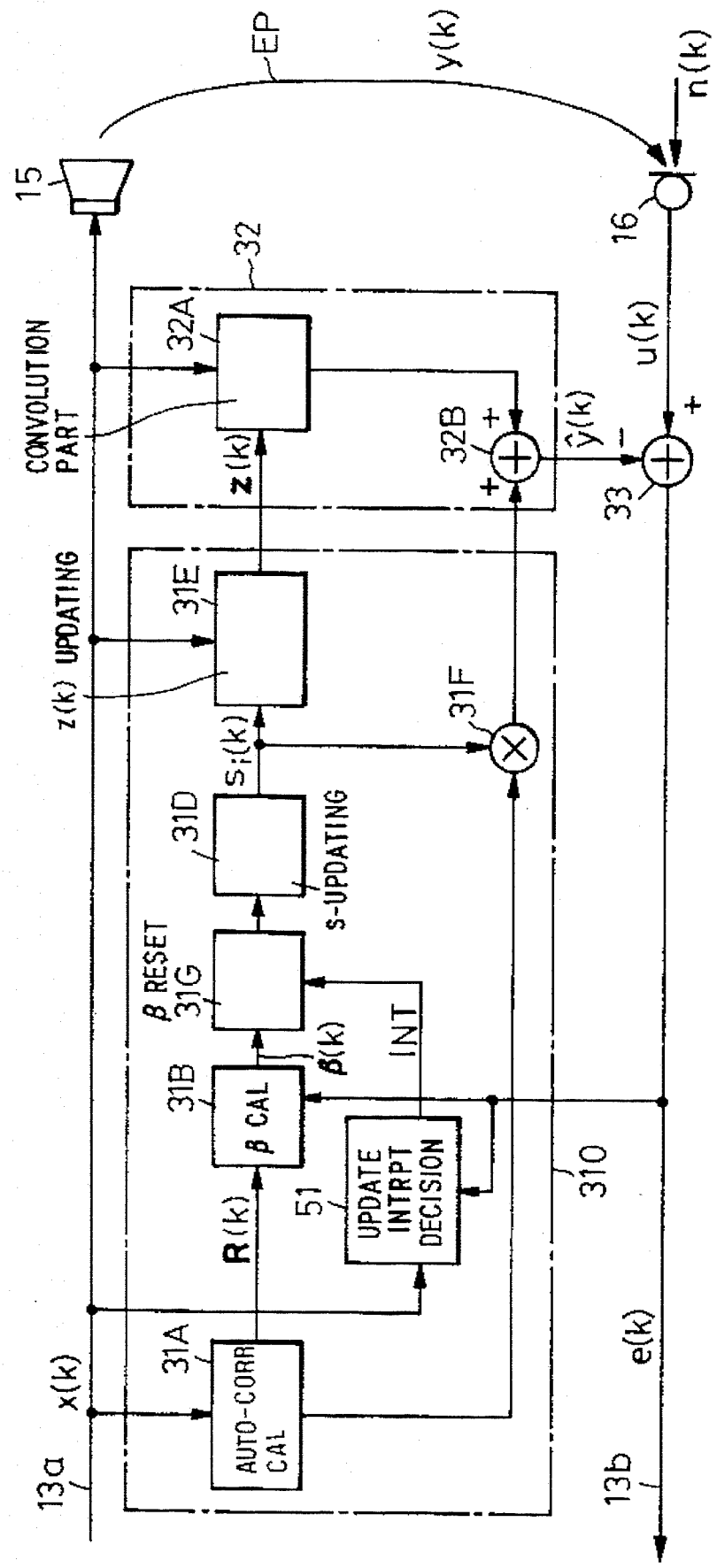
FIG. 10 is a block diagram illustrating the echo canceller according to the present invention.
Figure 11:
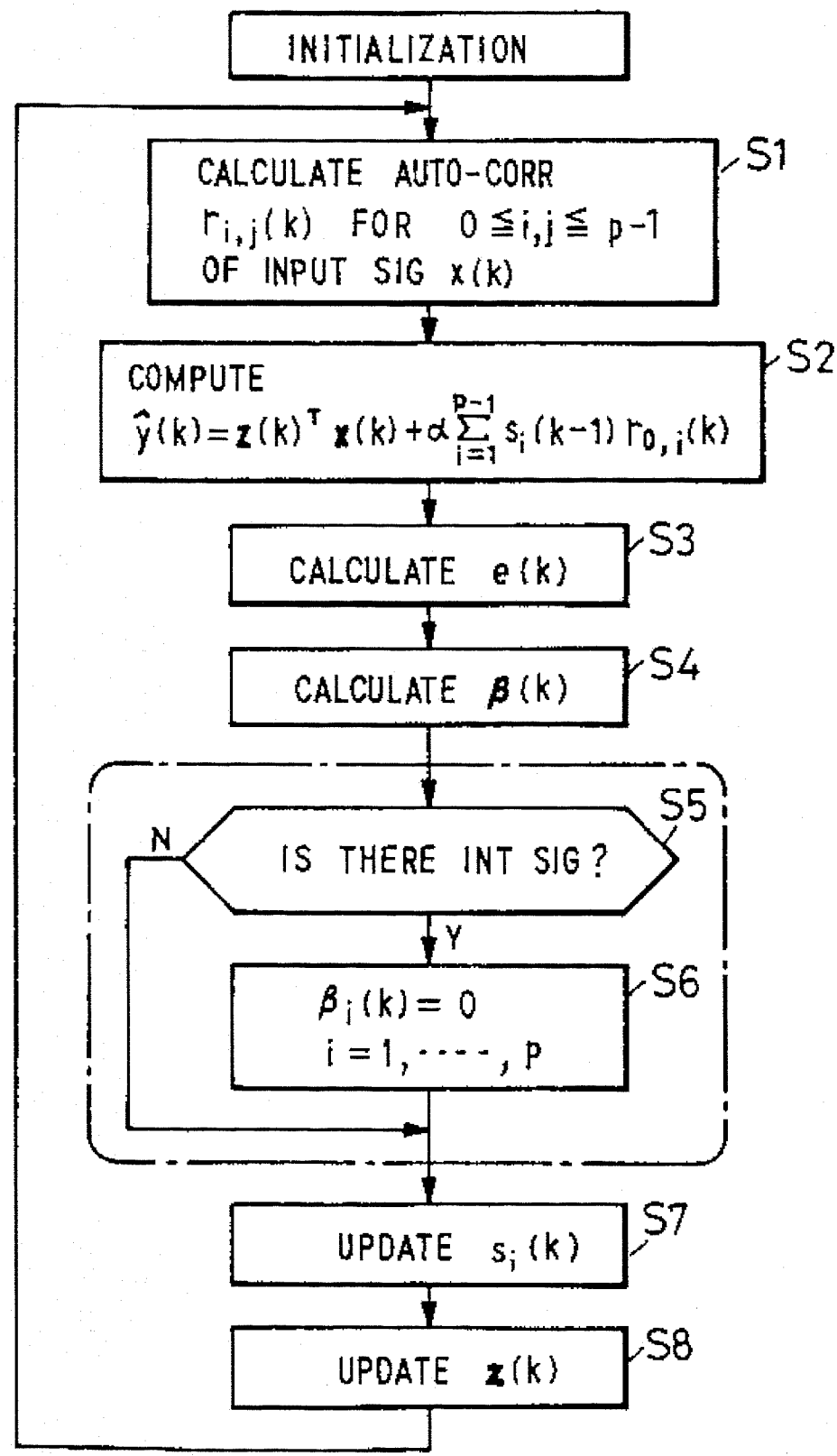
FIG. 11 is a flowchart for explaining the operation of the echo canceller of FIG. 10.

FIG. 10 illustrates in block form an embodiment of the acoustic echo canceller according to the present invention, in which the parts corresponding to those in FIG. 8 are identified by the same reference numerals. In this embodiment, a β resetting part 31G is provided between the β calculating part 31B and the s updating part 31D of the transfer function estimation part 31 in FIG. 8, and upon detection of the double-talking or send single-talking condition by the update interruption decision logic part 51, the update interruption signal INT is applied as a reset signal to the β resetting part 31G to reset the pre-filter coefficient β(k) to zero. Unlike in the prior art example of FIG. 8, even while the update interruption signal INT is provided, the updating operations of the s updating part 31D and the intermediate variable updating part 31E are performed, by which the estimated value $\hat{y}(k)$ can be generated. The procedure in this case is shown in FIG. 11. In step S1 the auto-correlation $r_{i,j}(k)$ of the input signal x(k) is calculated by Eq. (10), and in step S2 the estimated value $\hat{y}(k)$ of the output from the echo path EP is calculated by Eq. (15) on the basis of the convolution of the input signal x(k) and the intermediate variable z(k) and the inner product of the smoothed pre-filter coefficient $s_i(k)$ and the auto-correlation $r_{0,i}(k)$. In step S3 the estimation error e(k) is calculated which is the difference between the estimated value $\hat{y}(k)$ and the microphone output u(k) from the microphone 16, and in step S4 the pre-filter coefficient β(k) is calculated by Eq. (8). In step S5 a check is made for the presence of the update interruption signal INT; if not, the smoothed pre-filter coefficient $s_i(k)$ is updated by Eq. (12) in step S7 and the intermediate variable z(k) is updated by Eq. (13) in step S8. The processing of these steps is identical with the processing of step S7 and S8 in FIG. 9.

When the update interruption signal INT is detected in step S5, $\beta_i(k)$ is reset to zero by Eq. (20) in the β resetting part 31G (step S6), followed by step S7. That is, in this embodiment, since the processing involved is identical with that in the case of no update interruption signal INT being present, except setting $\beta_i(k)$ to zero for the duration of the signal INT, the number of times the multiplication-addition is conducted does not increase as compared with that when no update interruption signal INT is present, and the result of the convolution of the filter coefficient $\hat{h}(k_s)$ at the time $k_s$ of the generation of the update interruption signal INT and the received speech signal x(k) at the current time k is provided as the estimated value $\hat{y}(k)$ of the response of the echo path.

Figure 7:
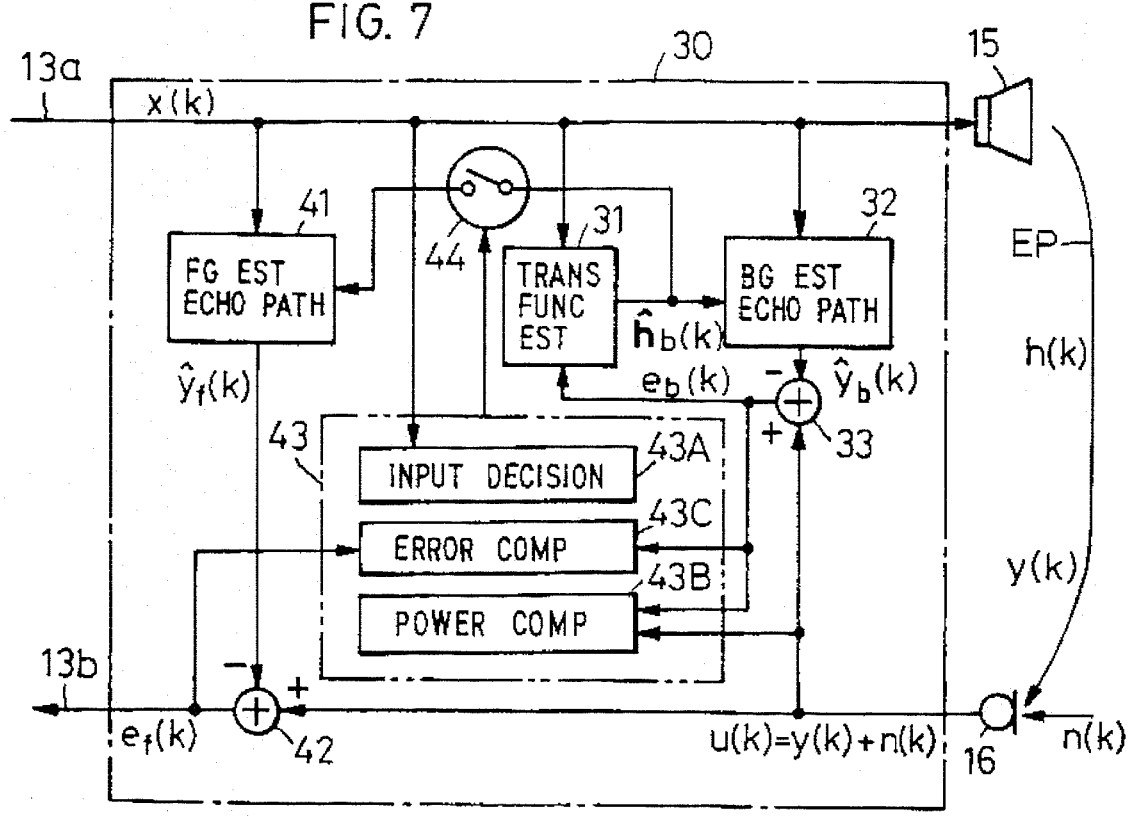
FIG. 7 is a block diagram of a conventional FG/BG type echo canceller.
Figure 12:
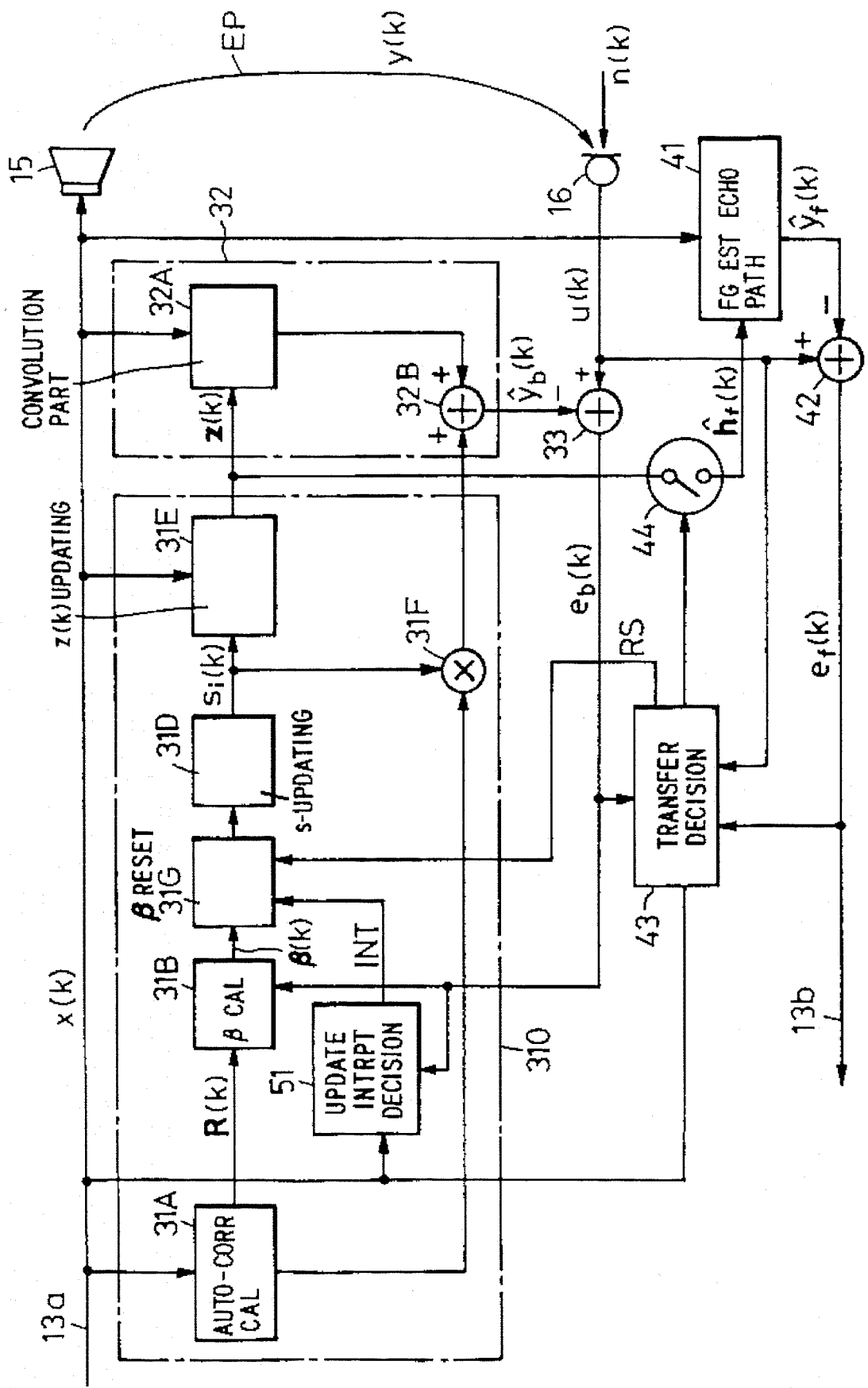
FIG. 12 is a block diagram of an FG/BG type echo canceller embodying the present invention.

Next, a description will be given, with reference to FIG. 12, of the application of the above-described fast projection scheme of the present invention to the FG/BG type acoustic echo canceller shown in FIG. 7. In FIG. 12 the parts corresponding to FIG. 10 are denoted by the same reference numerals. This embodiment has a construction in which the convolution part (corresponding to the FG side estimated echo path) 41, the subtractor 42, the transfer decision logic part 43 and the switch 44 in FIG. 7 are added to the configuration of the echo canceller depicted in FIG. 10. The filter coefficient of the convolution part (corresponding to the BG side estimated echo path) 32A is z(k). Only when the same conditions as the three transfer conditions described previously in respect of FIG. 7, that is, $Px(k)>P_{th}$, $Pe_b(k)<C.Pu(k)$ and $Pe_b(k)< Pe_f(k)$, are satisfied, it is decided by the transfer decision logic part 43 that the filter coefficients z(k) has converged, and the filter coefficient z(k) is provided as the filter coefficient $\hat{h}_f(k)$ to the convolution part 41 via the switch 44. Since the value of the intermediate variable z(k) at time k when the above-mentioned conditions are satisfied does not match the impulse response $\hat{h}(k)$ of the echo path estimated at that time, however, this embodiment obtains the impulse response $\hat{h}(k)$ through utilization of the conversion of the intermediate variable z(k) to the filter coefficient $\hat{h}(k)$ by Eq. (28) which can be done by the aforementioned resetting of β(k) to zero. That is, when the above-noted transfer conditions are satisfied, the transfer decision logic part 43 applies a reset signal RS to the β resetting part 31G for a predetermined period of time m (m≧p) to hold β(k) zero for that period, and when the intermediate variable z(k+m) from the intermediate variable updating part 31E becomes equal to the impulse response $\hat{h}(k)$, the transfer decision logic part 43 turns ON the switch 44, through which the filter coefficient at that time, z(k+m)= $\hat{h}(k)$, where m≧p, is transferred as the filter coefficient $\hat{h}_f(k)$ to the convolution part 41. The operation after the generation of the update interruption signal INT from the update interrupt decision logic part 51 is identical with the operation in the FIG. 10 embodiment.

As described above, according to the present invention, when noise (send speech) is large, adaptation is interrupted, by which the accuracy of estimation of the filter coefficient can be prevented from lowering, besides the intermediate variable can be converted to the filter coefficient without increasing the computational complexity and the number of storage areas.

With the combined use of the fast projection algorithm and the FG/BG scheme, the filter coefficient $\hat{h}(k)$ can be set in the FG side convolution part by resetting β to zero after time p during transfer; hence, a relatively simple configuration can be implemented.

Figure 1:
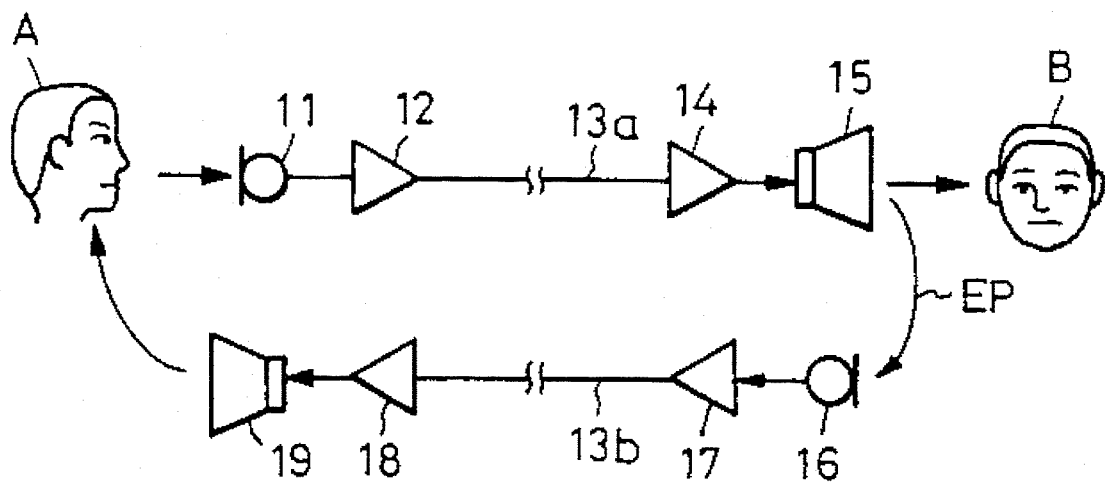
FIG. 1 is a schematic diagram of a conventional loudspeaking communication system.
Figure 2:
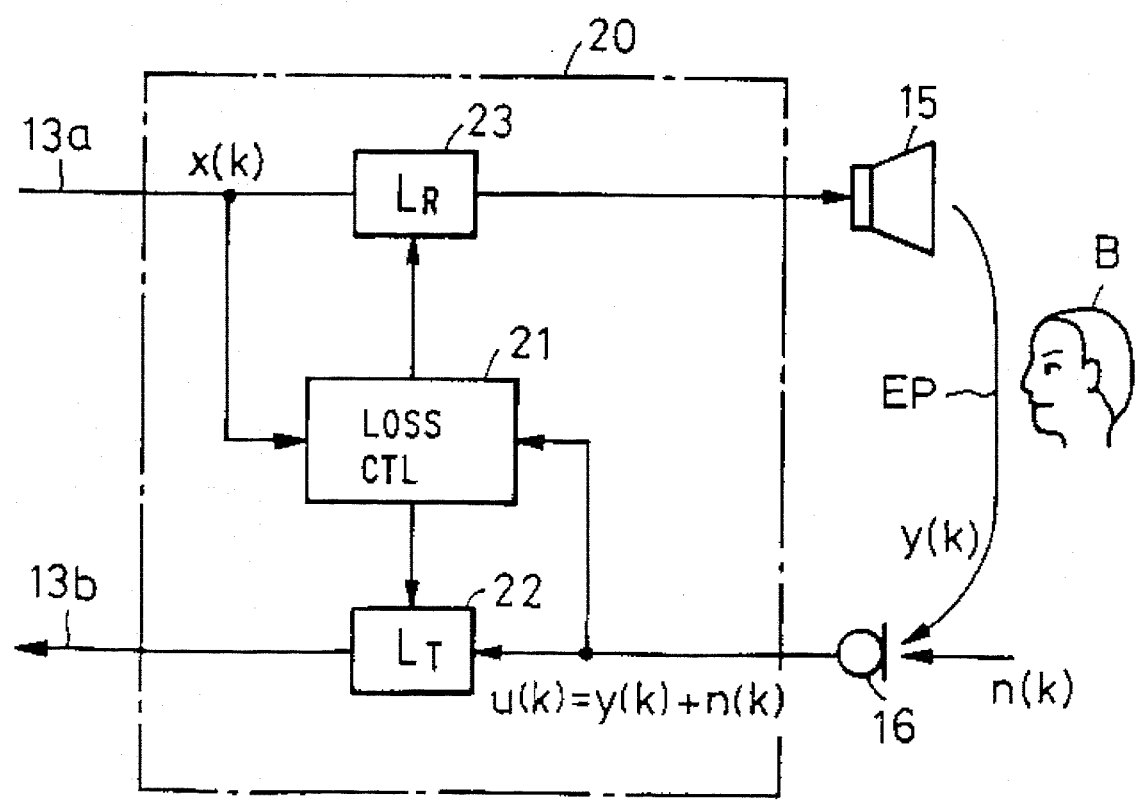
FIG. 2 is a block diagram showing a conventional loss insertion device.
Figure 3:
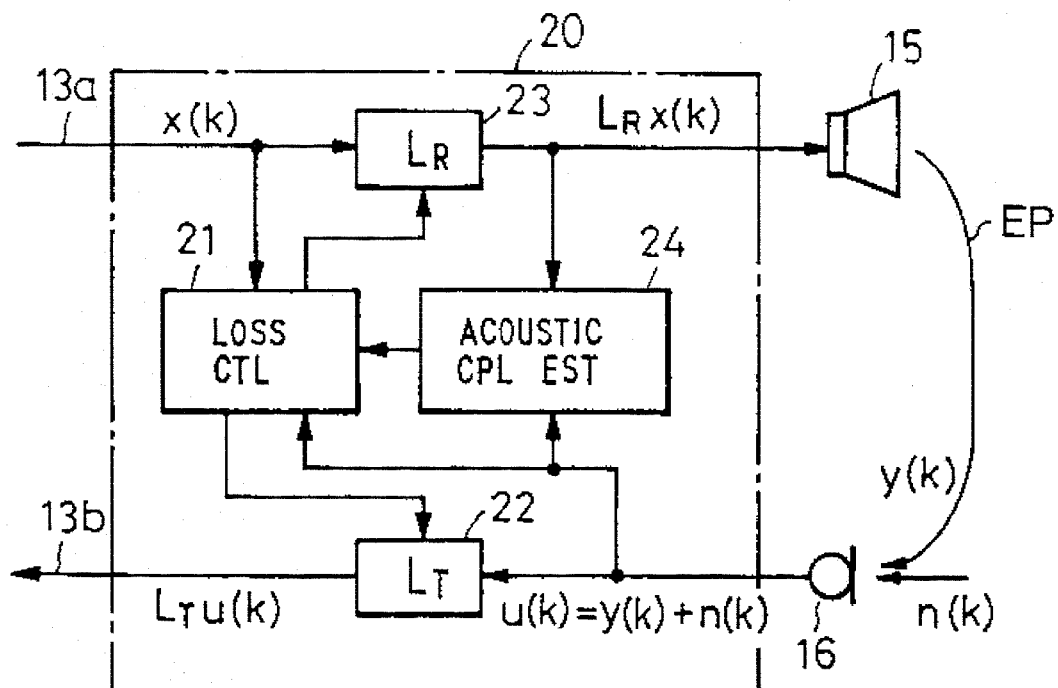
FIG. 3 is a block diagram showing a conventional adaptive loss control device.
Figure 13:
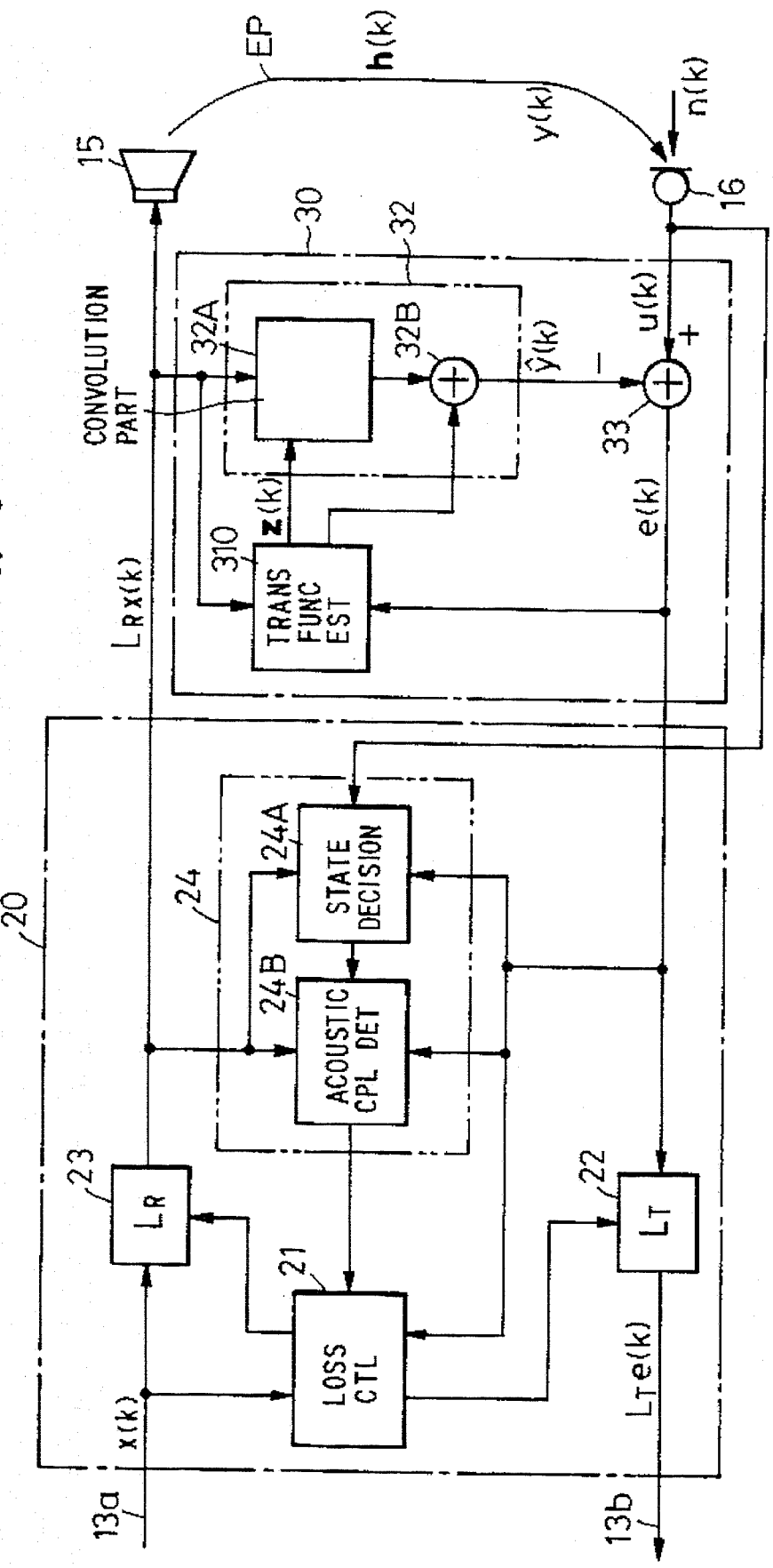
FIG. 13 is a block diagram illustrating an embodiment of the present invention wherein the echo canceller of FIG. 10 is combined with an adaptive loss control device.

FIG. 13 illustrates in block form another embodiment of the present invention, which is a combination of an echo cancelling part 30 similar to the embodiment of FIG. 10 and the adaptive loss control part 20 similar to that in FIG. 3. The configuration and operation of the echo cancelling part 30 are the same as in the FIG. 10 embodiment, and hence no description will be given of them. The acoustic coupling estimation part 24 of the adaptive loss control part 20 is made up of a state decision part 24A and an acoustic coupling determining part 24B.

The state decision part 24A is supplied with the received speech signal $L_Rx(k)$ having passed through the loss element 23, the microphone output u(k) from the microphone 16 and the error signal e(k) from the subtractor 33 and makes a state decision as described below and applies a decision signal to the acoustic coupling determining part 24B. The acoustic coupling determining part 24B estimates the acoustic coupling G of the system which includes the echo path EP and echo canceller 30 as described below and provided the estimated value to the loss control part 21.

The state decision part 24A calculates the powers Px(k), Pu(k) and Pe(k) of the input signal $L_Rx(k)$, the microphone output u(k) and the error signal e(k) as referred to below. For brevity's sake, can be of the power of the signal x(k) alone; but the powers of the other signals can similarly be calculated.

Assuming that signals have all been made discrete, the short time power from time k–N when the signals were made discrete to the current time k is expressed by the following equation.

$$Px(k) = \sum_{n=0}^{N-1} x^2(k-n) \quad (29)$$

Furthermore, as expressed by the following equation, the short time power can also be obtained by adding a squared value $x^2(k)$ of the input signal x(k) at the current time to the power Px(k–1) at the immediately preceding time and then subtracting a squared value $x^2(k-N)$ of the input signal at preceding time N.

$$Px(k)=Px(k-1)+x^2(k)-x^2(k-N) \quad (30)$$

Alternatively, setting ρ=(N–1)/N, the power can be obtained by the following equation.

$$Px(k)=x^2(k)+\rho Px(k-1) \quad (31)$$

Now, let $P_{th}$ denote a preset power threshold value indicating the presence of the received speech signal x(k) and set $C_1$ to a positive constant equal to or smaller than 1. In this case, when the following conditions are simultaneously satisfied, it is judged that the echo cancellation in the echo cancelling part 30 has been accomplished.

$$Px(k)>P_{th}$$

$$Pe(k)<C_1.Pu(k) \quad (32)$$

In this case, the integration period is set short (approximately 8 to 64 msec or so) because the state of incomplete convergence of the estimated echo path or double-talking, in particular, needs to be quickly detected so as to bring the state of convergence close to the actual one. When the condition (32) is satisfied, it can be considered that the near-end speaker's speech signal n(k) is not contained in the microphone output u(k) (the single-talk receiving condition); letting the values of the signals x(k) and e(k) integrated for a period longer than the above-mentioned short time be represented by PWx(k) and PWe(k), respectively, the acoustic coupling determining part 24B estimates the acoustic coupling G by the following equation.

$$G=PWe(k)/PWx(k) \quad (33)$$

The integration time for PWe(k) and PWx(k) may preferably be in the range of approximately 100 msec to 1 sec or so.

When it is determined in the state decision part 24A that the following conditions are satisfied at the same time, it is judged that the near-end speaker side loudspeaking system is in the double-talking condition in which the near-end speaker's speech signal n(k) is contained in the microphone output u(k).

$$Px(k)>P_{th}$$

$$Pe(k)>C_1.Pu(k) \quad (34)$$

Furthermore, if the following condition holds for a constant $C_2$ greater than 1, it is judged that the convolution part 32A is not correctly estimated because of a change of the echo path EP, that is, that the echo path is changing.

$$Pe(k) > C_2 . Pu(k) \quad (35)$$

During the double-talking the acoustic coupling G cannot correctly be estimated, but since there is the possibility of the echo path changing condition, not the double-talking condition, it is necessary to estimate the acoustic coupling G.

Since under the double-talking condition it is impossible to calculate the acoustic coupling G in a short time, it must be estimated for a long time. In such a case, the acoustic coupling determining part 24B estimates the acoustic coupling G over an extended period of time longer than the time for which the double-talk is expected to last (about 3 sec). More specifically, the acoustic coupling estimation part 24B estimates the acoustic coupling G in such a manner as mentioned below.

(1) The powers PPe(k) and PPx(k) of an extended integration time are used to estimate the acoustic coupling G by the following equation.

$$G = PPe(k)/PPx(k) \quad (36)$$

(2) The acoustic coupling Pe(k)/Px(k) or PWe(k)/PWx(k) estimated in a short time is averaged over an extended time to estimate the acoustic coupling G by the following equation.

$$G = 1/T \sum_{i=0}^{T} Pe(k-i)/Px(k-i) \quad (37)$$

(3) When it is judged that the system is in the double-talking condition, no loss calculation is performed and the acoustic coupling G at the previous time is held. In this case, however, there is the possibility that the echo path EP is changing; hence, letting $C_2$ denote a predetermined constant greater than 1, when $Pe(k) > C_2.Pu(k)$, the initially set value G is estimated as the acoustic coupling.

The acoustic coupling G thus estimated in the acoustic coupling determining part 24B is provided to the loss control part 21. Based on the estimated acoustic coupling G, the loss control part 21 determines the loss to be inserted so that the gain of the open loop becomes smaller than 1.

Figure 14:
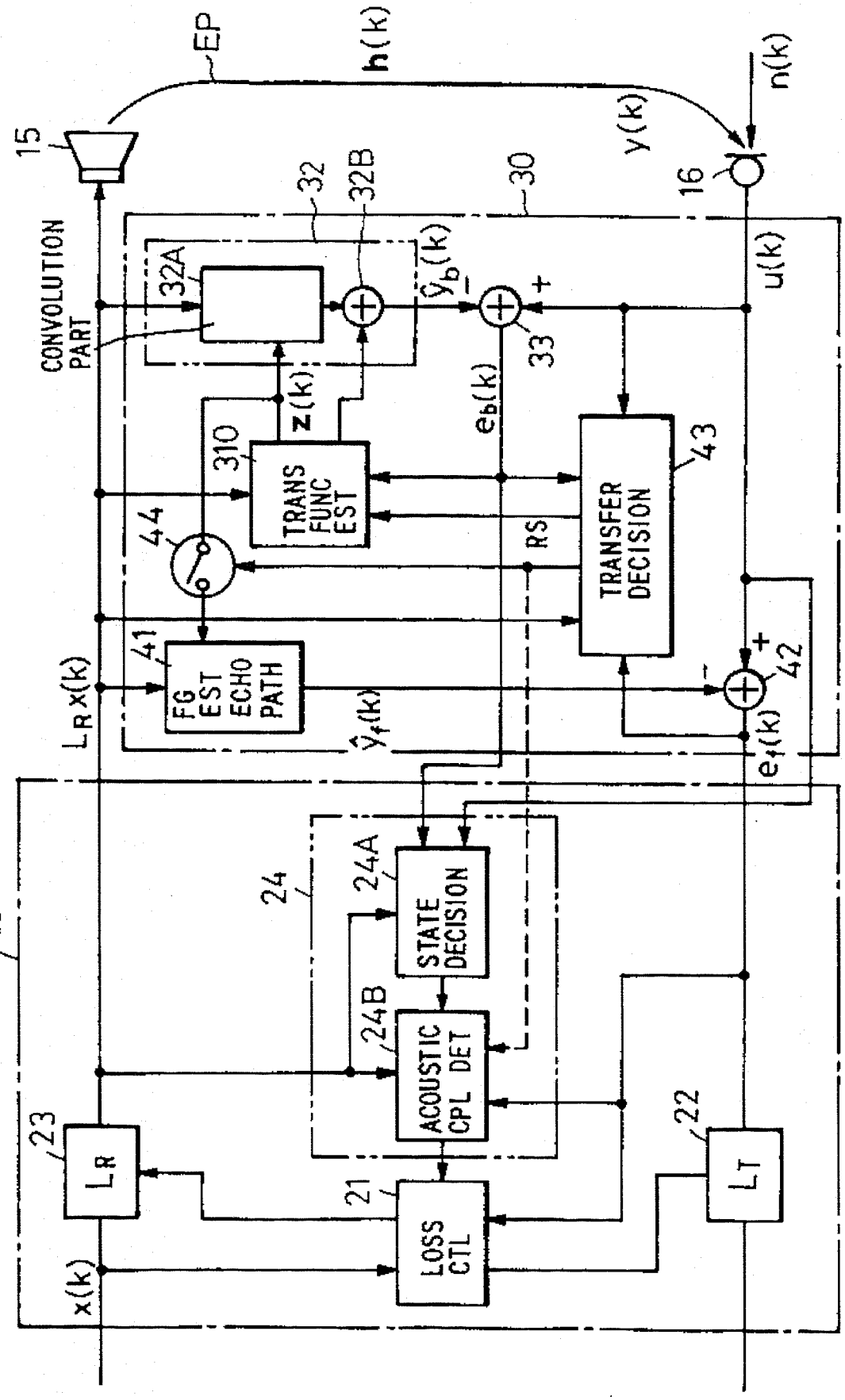
FIG. 14 is a block diagram illustrating another embodiment of the present invention wherein the adaptive loss control device is combined with the FG/BG type echo canceller of FIG. 12.

FIG. 14 illustrates in block form the construction of an echo canceller which is a combination of the FG/BG scheme, the FIG. 12 embodiment and the adaptive loss control part 30 in FIG. 13. The parts corresponding to those in FIGS. 12 and 13 are denoted by the same reference numerals. Since the configuration and operation of the echo cancelling part 30 are the same as in FIG. 12, no description will be given of them. The configuration and operation of the adaptive loss control part 20 are also basically identical with those in FIG. 13, but in this embodiment, the acoustic coupling estimation part 24B, the loss control part 21 and the loss element 22 are supplied with the error signal $e_f(k)$ from a subtractor 42 in place of the error signal $e_b(k)$ from the subtractor 33. The state decision part 24A calculates, for example, the short time powers Px(k), Pu(k) and $Pe_b(k)$ of the input signal $L_R x(k)$, the microphone output u(k) and the error signal $e_b(k)$ as in the embodiment of FIG. 13. These powers may be calculated by any of Eqs. (29), (30) and (31) referred to previously with respect to FIG. 13 embodiment.

As is the case with the foregoing embodiments, when the power Px(k) satisfies the following conditions at the same time in the state decision part 24A, it is judged that the echo cancellation in the echo cancelling part 30 has been accomplished.

$$Px(k) > P_{th}$$

$$Pe_b(k) < C_1.Pu(k) \quad (32')$$

In this instance, since it can be considered that the near-end speaker's speech signal n(k) is not contained in the microphone output u(k) (the single-talk receiving condition), the acoustic coupling estimation part 24B estimates the acoustic coupling G by the following equation accordingly.

$$G = PWe_f(k)/PWx(k) \quad (33')$$

When it is decided in the state decision part 24A that the following conditions are satisfied at the same time, the system is in the double-talking condition in which the near-end speaker's speech signal n(k) is contained in the microphone output u(k), or the echo path EP is changing and the convolution part 32A is not correctly estimated.

$$Px(k) > P_{th}$$

$$Pe_b(k) > C_1.Pu(k) \quad (34')$$

Under the double-talking condition the acoustic coupling G cannot correctly be estimated, but since there is the possibility of the echo path changing state, not the double-talking state, it is necessary to estimate the acoustic coupling G.

During double-talking the acoustic coupling G cannot be calculated in a short time as mentioned previously, and hence needs to be estimated for a long time. In such a case, the acoustic coupling estimation part 24B estimates the acoustic coupling G over an extended period of time longer than the time for which the double-talk is expected to last (approximately 3 sec). The acoustic coupling estimation part 24B estimates the acoustic coupling G in the same manner as described previously with reference to FIG. 13 embodiment.

The operation of the echo canceller shown in FIG. 14 will hereunder be described in brief.

Upon application of the received speech signal $L_R x(k)$ to the loudspeaker 15, the echo signal y(k) is input into the microphone 16 via the echo path EP which is formed between the loudspeaker 15 and the microphone 16. The transfer function estimation part 310 estimates the intermediate variable z(k) of the impulse response of the echo path EP and provides the estimated variable z(k) to the convolution part 32A of the BG side estimated echo path 32. The output from the convolution part 32A is applied to the adder 32B for input as the BG side estimated echo signal $\hat{y}_b(k)$ into the subtractor 33, wherein it is subtracted from the microphone output u(k) to obtain the error signal $e_b(k)$, which is applied to the transfer decision logic part 43. On the other hand, there is set in the FG side estimated echo path 41 a proper initial value of the filter coefficient, and by its convolution with the input signal $L_R x(k)$, the FG side estimated echo signal $\hat{y}_f(k)$ is provided to the subtractor 42, wherein it is subtracted from the microphone output u(k) to obtain the FG side error signal $e_f(k)$.

The transfer decision logic part 43 is supplied with the microphone output u(k), the error signals $e_b(k)$ and $e_f(k)$ and the input signal x(k) and compares their powers in terms of magnitude. The method for comparison is such as described previously. If it is found by the comparison that predetermined conditions are satisfied, it is judged that the coefficient z(k) of the BG side convolution part 32A has been converged. Then, the reset signal RS is applied to the β resetting part 31G (see FIG. 12) in the transfer function estimation part 310 for a period longer than that p, after which the switch 44 is turned ON, through which the coefficient z(k) outputted from the intermediate variable updating part 31E of the transfer function estimation part 310 at that time is transferred as the filter coefficient $\hat{h}_j(k)$ to and set in the FG side estimated echo path 41.

The state decision part 24A of the adaptive loss control part 20 is supplied with the error signal $e_b(k)$ from the subtractor 33, the microphone output u(k) from the microphone 16 and the received speech signal $L_R x(k)$ and, as in the case of FIG. 13, calculates the short time powers of the signals and decides the aforementioned condition (32'). The acoustic coupling determining part 24B estimates the acoustic coupling G by Eq. (33') on the basis of the result of the decision and provides the estimated value to the loss control circuit 21. The loss control circuit 21 calculates the loss on the basis of the estimated acoustic coupling G and sets the loss in the loss element 22 or 23.

In the echo cancelling part 30 of the embodiment of FIGS. 13 and 14, when the ERLE by the echo cancelling part 30 is small in the initial stage, the insertion loss of the adaptive loss control part 20 can be increased to suppress the echo, and when the echo signal has been cancelled to some extent, the insertion loss of the adaptive loss control part 20 can be decreased.

In the FIG. 14 embodiment, it is also possible to employ a construction in which, instead of deciding the condition (32') in the state decision part 24A, when a filter coefficient transfer instruction is provided from the transfer decision logic part 43, it is judged that the convergence of the estimated impulse response has been completed (that the echo cancellation has been accomplished), and the transfer instruction signal is applied to the acoustic coupling determining part 24B as indicated by the broken line.

In the FG/BG system depicted in FIGS. 12 and 14, there are cases where even if the estimated echo path 32 of the BG side differs from that of the true echo path EP, the transfer decision logic part 43 satisfies the aforementioned three conditions and transfers a wrong coefficient of the BG side 32 to the FG side estimated echo path 41. The reason for this is that, especially when the input signal x(k) is a vowel like as a sinusoidal waveform, the power of the error signal e(k) decreases even if the coefficient of the convolution part 32A is wrong.

Thus, in the echo cancelling part 30, the situation may sometimes arise where the estimated echo path 32 does not simulate the true echo path EP even if the error signal e(k) or $e_b(k)$ is smaller than the echo signal y(k). In the variable step size type adaptive algorithm, since in such a case it is judged that the estimated impulse response has converged, even if not converged yet, the step size parameter α is made small, resulting in the retardation of the convergence. In the FG/BG type echo canceller, the coefficient of the BG side estimated echo path which has not converted yet is erroneously transferred to the FG side.

In the FIG. 13 embodiment which is a combination of the echo cancelling part 30 and the adaptive loss control part 20, for example, when the echo path EP changes, the estimated value G of the acoustic coupling becomes a little large initially set value pursuant to Eq. (35), preventing the occurrence of howling. If thereafter the error e(k) becomes smaller as compared with the rate of convergence of the actual adaptive filter, however, there is a likelihood that Eq. (32) is satisfied, resulting in the acoustic coupling being reduced down to a value smaller than the insertion loss that is needed to prevent howling. This could be avoided by extending the integration time for obtaining the powers of the signals e(k) and u(k) which are checked to see if $Pe(k) < C_1 \cdot Pu(k)$. But the extension of the integration time causes the integration centroid to shift backward, presenting problems that the system cannot follow the fluctuation of the echo path and changes such as the start of double-talk.

The problems mentioned above all stem from the fact that the state or degree of convergence cannot accurately judged with the powers Pu(k) and Pe(k).

Next, a description will be given, with reference to FIG. 15, of another embodiment of the echo canceller according to the present invention which is improved to ensure an accurate judgement of the degree of convergence of the estimated echo path to the true one.

Figure 15:
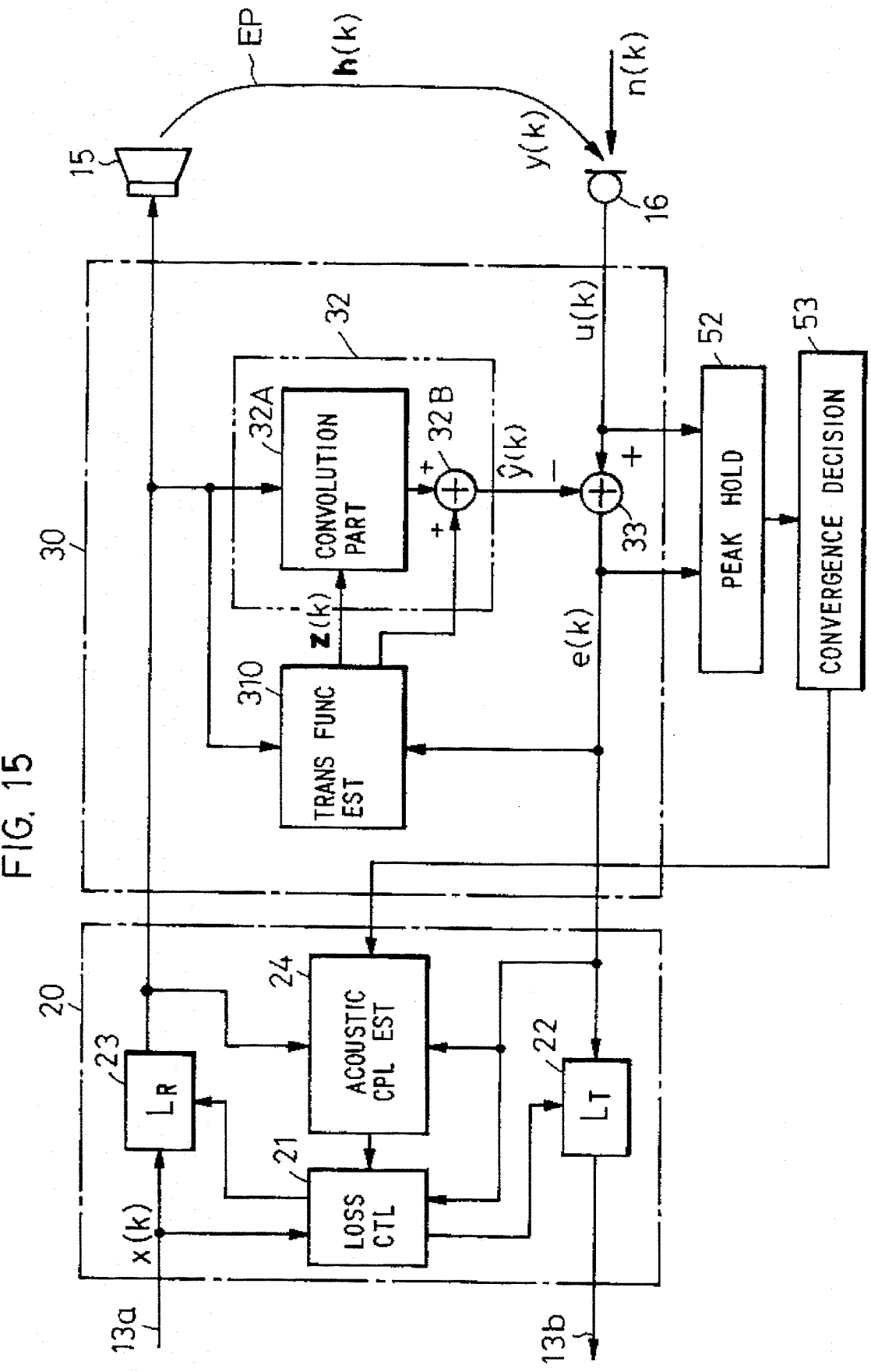
FIG. 15 is a block diagram illustrating a modified form of the FIG. 13 embodiment which is designed to judge the state of convergence by a peak hold technique.

The FIG. 15 embodiment is an improved version of the FIG. 13 embodiment, in which the parts corresponding to those in the latter are identified by the same reference numerals. The echo cancelling part 30 is identical in construction and operation with the echo cancelling part 30 in FIG. 13 and consequently common to the device of FIG. 10. This embodiment includes a peak hold circuit 52, which is supplied with the microphone output u(k) and the error signal e(k). The peak hold circuit 52 is used to continuously detect peak values of a sample power of each of the signals u(k) and e(k) within a certain period of time, and hence can be called a moving peak hold circuit. The peak hold circuit 52 conducts the following calculations, for instance.

$$PHu(k) = MAX\{u^2(k), \gamma PHu(k-1)\} \quad (38)$$

$$PHe(k) = MAX\{e^2(k), \gamma PHe(k-1)\} \quad (39)$$

where PHu(k) and PHe(k) are peak hold values of the signals u(k) and e(k), γ an attenuation constant and MAX{a, b} a function which compares a and b and outputs the larger value. The attenuation constant γ has a value smaller than 1, preferably in the range of 0.9999±0.0005. In this example, the signal power is calculated using only a squared value in each sample.

The outputs PHu(k) and PHe(k) from the peak hold circuit 52 are applied to a convergence decision circuit 53, wherein their ratio is calculated, for example, as follows:

$$A(k) = 10 \log\{PHu(k)/PHe(k)\} \quad (40)$$

This value is used to decide or judge the degree of convergence; that is, the larger the ratio, the higher the degree of convergence. The ratio A(k) is input into the state decision part 24A of the acoustic coupling estimation part 24. When $Px(k) > P_{th}$ and the ratio A(k) is larger than a preset value $W_1$ (15 (dB), for instance), the state decision part 24 judges that the near-end speaker side loudspeaking system is in the receive single-talk condition. When $Px(k) > P_{th}$ and $A(k) < W_1$, it is judged that the near-end speaker side loudspeaking system is in the double-talk condition. After this, the acoustic coupling G is determined by the acoustic coupling determining part 24B in the same manner as described previously with respect to FIG. 13 embodiment. The loss control part 21 determines the insertion loss on the basis of the thus determined acoustic coupling G and sets the loss in the loss element 22 or 23, depending upon the near-end speaker side loudspeaking system is in the receive or send condition.

Figure 16:
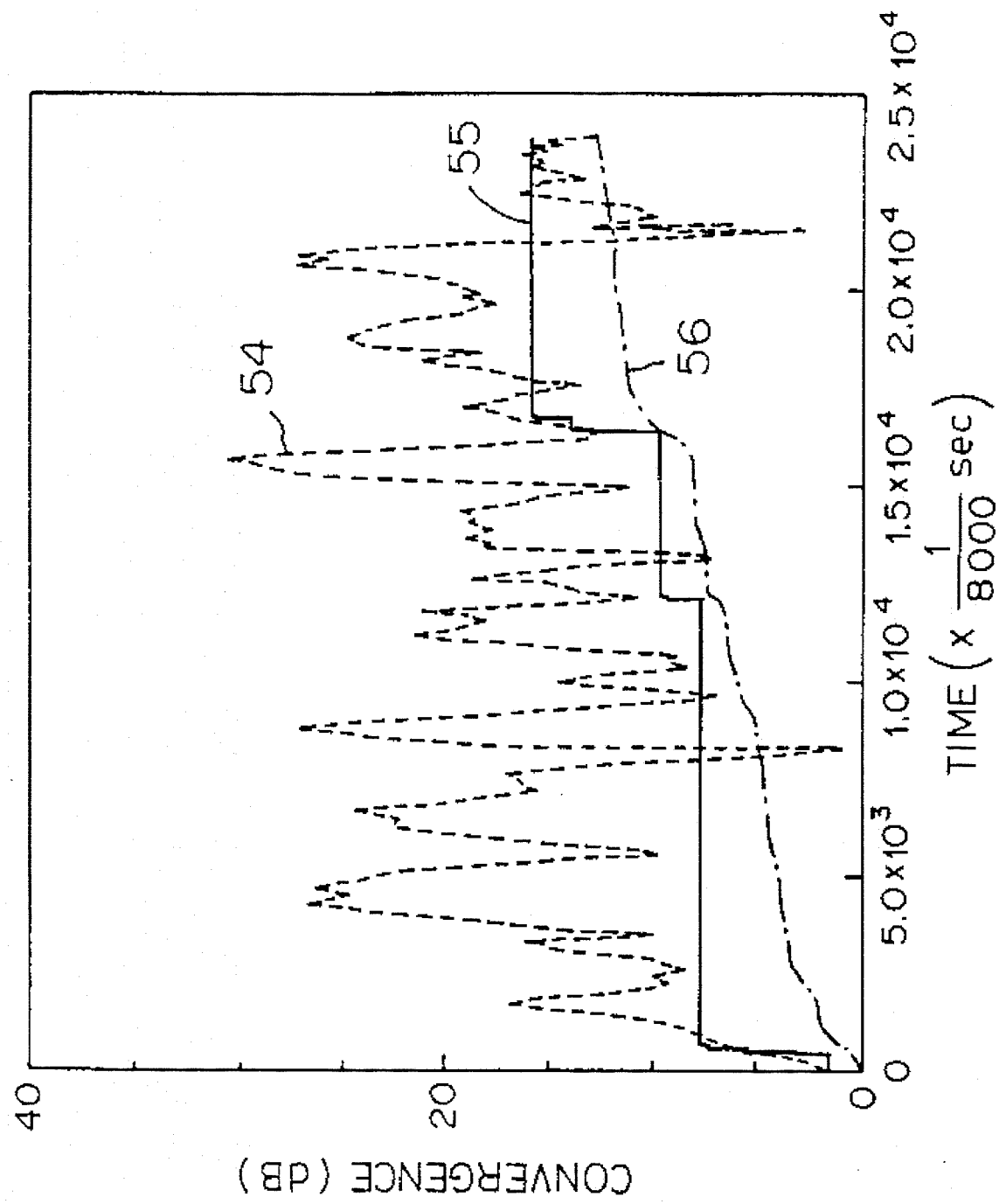
FIG. 16 is a graph showing convergence characteristics based on the peak hold value.

FIG. 16 is a graph showing the results of simulations about the convergence of the estimated echo path. The abscissa represents time and the ordinate a value indicating the degree of convergence of the estimated echo path 32 to the true one EP, the larger the value, the higher the degree of convergence. The broken line 54 indicates the ratio, 10 log {Pu(k)/Pe(k)}, between the powers Pu(k) and Pe(k) of the microphone output u(k) and the error signal e(k), calculated without utilizing the peak hold scheme as in the conventional assessment of the degree of convergence. The integration time used in this case to calculate the power is short, because an extended integration time induces a time lag between the assessment of the degree of convergence and the actual one. The solid line 55 indicates the value of convergence calculated by equation (40) using the peak hold values PHu(k) and PHe(k). The attenuation constant γ was set to 0.9999. The one-dot chain line 56 shows the true convergence between the echo path EP and the estimated one 32. That is, because of simulation, the impulse response h(k) of the echo path EP is known and the degree of approximation of the impulse response of the estimated echo path to that of the echo path EP is calculated using the following equation, for instance.

$$\sum_{i=1}^{L} 10 \log_{10}\{h_i^2(k)/[h_i(k) - \hat{h}_i(k)]^2\} \quad (41)$$

It will be seen from FIG. 16 that, in the prior art, even if the characteristic of the estimated echo path 32 is not close to that of the true echo path EP, there are cases where the value representing the degree of convergence is large. On the other hand, in the case of using the peak hold values as in the FIG. 15 embodiment, the convergence (indicated by the solid line 55) is less scattering and closer to the convergence of the estimated echo path 32 (indicated by the one-dot chain line 56). This reveals that as compared with the conventional method using the power comparison scheme, the method utilizing the peak hold values permits more accurate evaluation of the true state of convergence of the estimated echo path 32 to the echo path EP. With too large a value of the attenuation constant γ, for example, even if the powers of the signals u(k) and e(k) become zero, their power peak value are maintained, making it impossible to detect their subsequent peak hold values. With too small a value of the attenuation constant γ, the evaluation of the convergence of the estimated echo path closely follows instantaneous fluctuation of the signals u(k) and e(k) as in the prior art; hence, it is not preferable to set the attenuation constant to an excessively small value. For instance, when the sample frequency is 8 kHz, the attenuation constant γ is set to 0.9999 so that 1/(1−y)=10000 to avoid the influence of small power portions before and after a vowel.

In this embodiment, since the convergence value calculated with the power of the microphone output u(k) held large is kept thereafter by the peak hold technique, it is possible to avoid the calculation of an incorrect convergence value which is induced when the microphone output u(k) is temporarily small—this suppresses the dispersion in calculated values of convergence. Furthermore, there are cases where a vowel or the like provides an apparently quick convergence although it does not actually converge, but according to the present invention, when convergence does not occur at the beginning of the vowel, a large value of the error signal e(k) at that time is kept intact, and hence it is possible to calculate a convergence value which is close to the accurate one.

As is evident from FIG. 16, the degree of convergence close to that of the actual echo path EP can be calculated in this embodiment which employs, in combination, the echo cancelling part 30 and the adaptive loss control part 20 and utilizes the method of evaluating the convergence by the peak hold technique. The adaptive loss control part 20 is capable of decreasing the insertion loss with an increase in the ERLE obtained in the echo cancelling part 30. With the above-described conventional power comparison method, however, there are cases where it is judged, in terms of computation, that the echo has been cancelled out, though not actually so, and the acoustic coupling G at that time is measured following Eq. (33), and in such a case, the insertion loss is often set to an unnecessarily small value. In the embodiment of FIG. 15, the peak hold ratio (the curve 55) calculated in the convergence decision circuit 53 is close to the actual convergence value (the curve 56) the peak hold ratio is provided to the state decision circuit 24A to ensure the detection of the actual state of convergence, and the acoustic coupling G at that time is determined by the acoustic coupling determining part 24B. Thus, the loss control part 21 is able to determine an appropriate insertion loss.

While in the above the present invention has been described as being applied to the echo canceller using a combination of the adaptive loss control part and the echo cancelling part, the invention is also applicable to a device with a combination of the adaptive loss control part 20 and the FG/BG type echo cancelling part 30.

Figure 17:
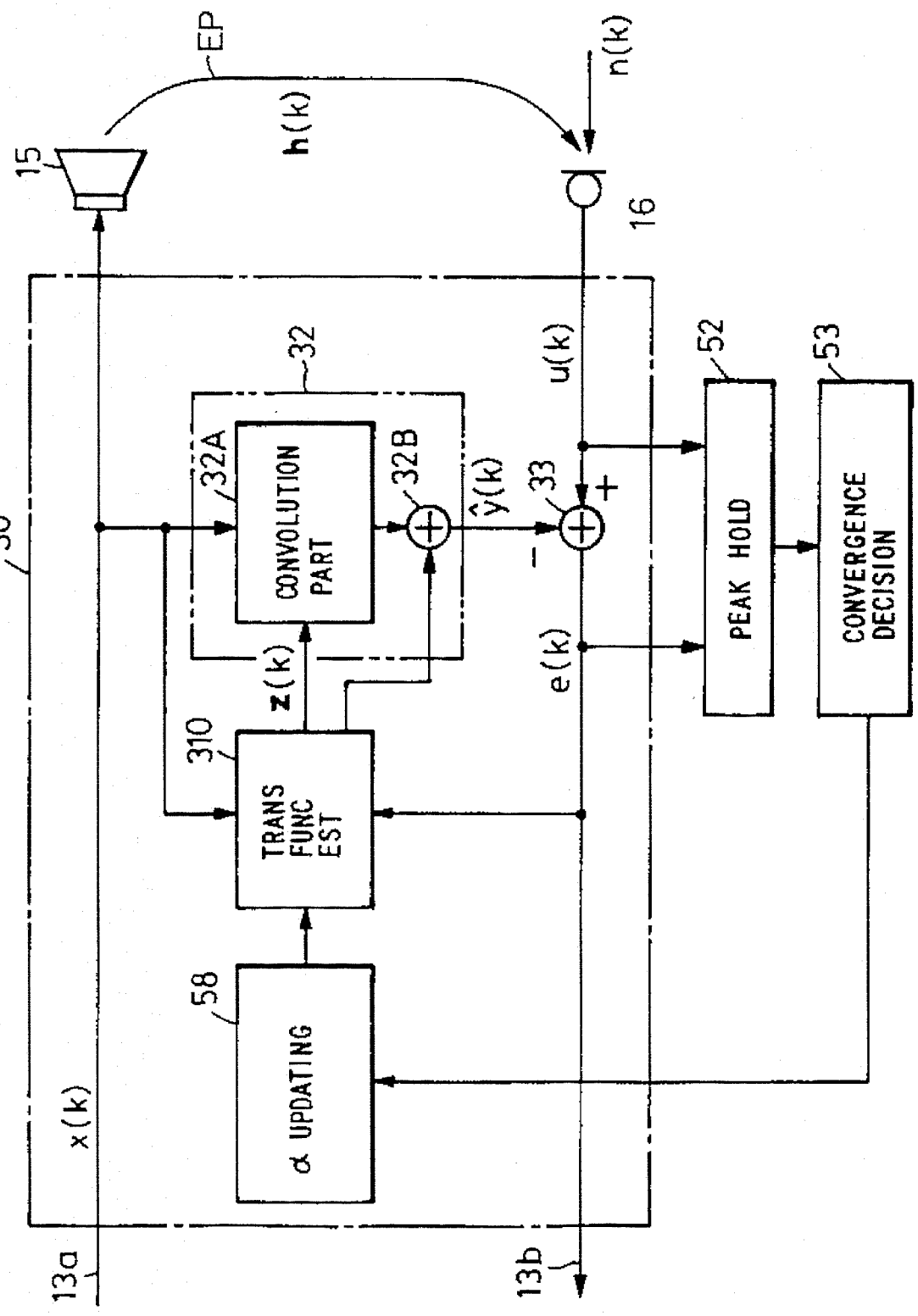
FIG. 17 is a block diagram illustrating a modified form of the FIG. 10 embodiment which is designed to change the step size on the basis of the peak hold value.

FIG. 17 illustrates in block form another embodiment of the present invention in which the peak hold method is combined with the adaptive algorithm for the echo path estimation of the echo canceller. In FIG. 17 the parts corresponding to those in FIG. 10 are denoted by the same reference numerals. In this embodiment a step size parameter changing part 58 is provided, which controls the magnitude of the step size α in accordance with the convergence value detected by the convergence decision circuit 53 and provides it to the transfer function estimation part 310. For various adaptive algorithms such as the LMS, NLMS and projection algorithms, there has been proposed a variable step size parameter type adaptive algorithm according to which when the estimated impulse response has not converged, the step size parameter α is set to 1 to increase the convergence rate and when the impulse response has converged to some extent, the step size parameter α is set to a smaller value to decrease the steady ERLE. In this variable step size parameter type algorithm, the step size parameter α is made variable with the degree of convergence, and hence it is necessary to accurately calculate the state of convergence.

With the use of the peak hold technique described above in respect of FIG. 16, it is possible to calculate how much dB the convergence has proceeded, with an appreciably high degree of accuracy. In this embodiment, the output from the convergence decision circuit 53 is applied to the step size parameter changing part 58. For example, in the case of FIG. 16, when the output from the convergence decision circuit 53 and consequently the convergence value is below 10 dB, the step size parameter α is set to 1; when the convergence value is in the range from 10 to 15 dB, the step size parameter α is set to 0.5; and when the convergence value is above 15 dB, the step size parameter α is set to 0.1. The step size parameter α that is thus controlled is provided, as the step size of the adaptive algorithm in the transfer function estimation part 310, to the intermediate variable updating part 31E (see FIG. 10), wherein it is used to update the intermediate variable z(k) by Eq. (13). As will be seen from the curve 55 in FIG. 16, according to the peak hold method, the step size α can be changed, with the time-varying dispersion in the convergence value held small. In the conventional evaluation of the degree of convergence, the time-varying dispersion in the convergence value is larger than in the case of the actual convergence (curve 56 in FIG. 16), and consequently, the step size parameter α may sometimes be set to as small a value as 0.1 even when no convergence takes place.

Figure 18:
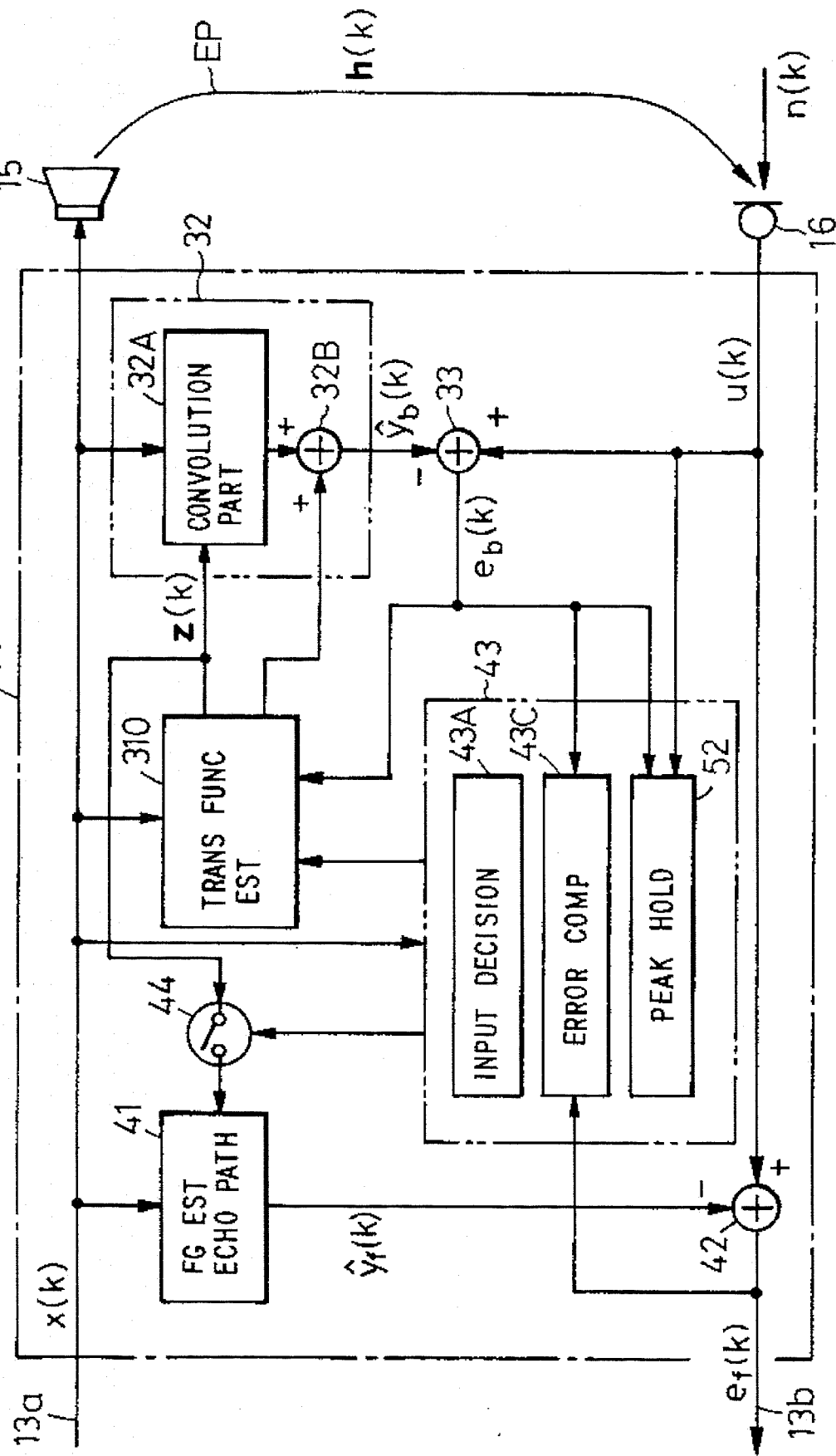
FIG. 18 is a block diagram illustrating a modified form of the FIG. 12 embodiment which is designed to judge the state of convergence on the basis of the peak hold value.

FIG. 18 illustrates in block form another embodiment of the present invention which applies the peak hold method to the FG/BG type echo canceller. The parts corresponding to those in FIGS. 7 and 12 are identified by the same reference numerals. In the FG/BG system of either of FIGS. 7 and 12, as described previously, the power comparison part 43B judges the afore-noted filter coefficient transfer condition that the BG side estimated echo path 32 is more approximate to the true echo path EP, by making a check to see if the aforementioned three conditions are satisfied, that is, (a) whether the power Px(k) of the input signal x(k) is larger than the threshold value, (b) whether the power of the BG side error signal $e_b(k)$ is smaller than the power of the FG side error signal $e_f(k)$, and (c) whether the power of the error signal $e_b(k)$ is smaller than the power of the microphone output u(k) to some extent. With the peak hold method applied to the FG/BG system, a check is made to determine if the peak hold value of the error signal $e_b(k)$ has been reduced smaller than the peak hold value of the microphone output u(k) by a certain degree or more in the peak hold circuit 52, instead of checking the above-mentioned condition (c). As described previously with reference to FIG. 16, the peak hold value comparison method, compared with the power comparison one, permits accurate detection of the state of convergence of the estimated echo path 32 to the true one EP. Thus, the peak hold value comparison method solves the problem of the power comparison method that the filter coefficient z(k) set in the BG side convolution part 32A is transferred to the FG side estimated echo path 41 when the BG side estimated echo path 32 differs from the true echo path EP.

Also in the transfer function estimation part 310 in each of FIGS. 15 and 18, the step size parameter updating part 58 may be provided to change the step size α with the output from the convergence decision circuit 53 as described previously in respect of FIG. 17.

A description will be given of an inverse peak hold value method as a substitute for the above-described peak value method to more accurately evaluate the state of convergence.

Figure 19:
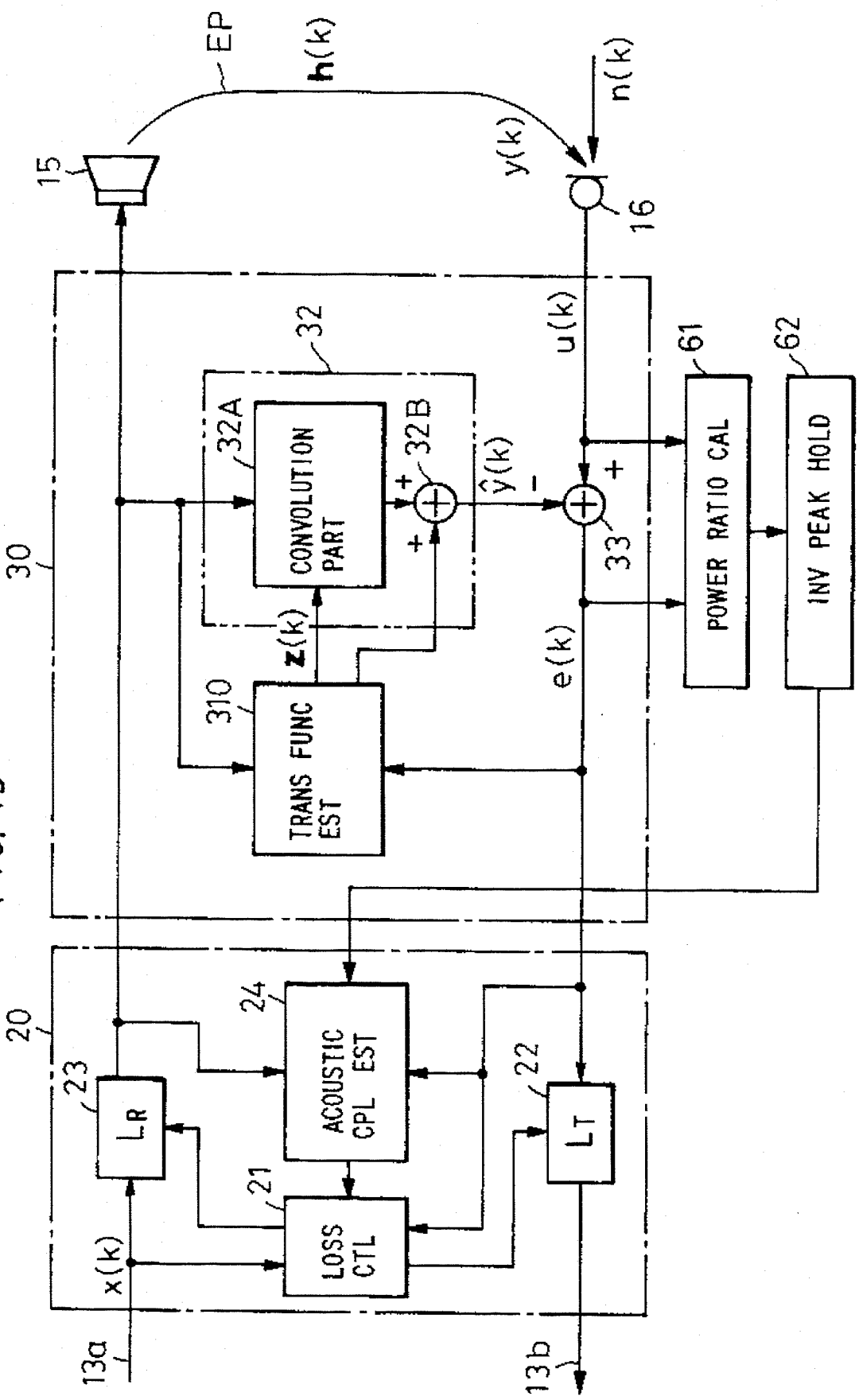
FIG. 19 is a block diagram illustrating another modified form of the FIG. 13 embodiment which is designed to judge the state of convergence by an inverse peak hold technique.

FIG. 19 illustrates another embodiment of the present invention which applies the inverse peak hold value method to the FIG. 13 embodiment which is a combination of the echo cancelling part 30 and the adaptive loss control part 20 as is the case with FIG. 15. The parts corresponding to those in FIG. 13 are denoted by the same reference numerals. In this embodiment a power ratio calculating part 61 and an inverse peak hold circuit 62 are further provided. The power ratio calculating part 61 calculates the ratio, ER(k)=Pu(k)/Pe(k), between the powers Pu(k) and Pe(k) of the microphone output u(k) and the error signal e(k). The inverse peak hold circuit 62 continuously detects the minimum value, i.e. an inverse peak value Np(k) of the power ratio ER(k) within a predetermined period of time. That is, a moving inverse peak value is detected. The inverse peak value NP(k) is calculated in the inverse peak hold circuit 62 by the following equation.

$$NP(k)=MIN\{ER(k), \tau NP(k-1)\} \qquad (42)$$

where τ is an inverse attenuation constant, which is a value very close to 1 greater than 1. The inverse attenuation constant is dependent upon the conversion rate of the algorithm used and the tap number L of the adaptive filter but is selected such that the conversion rate of the algorithm is approximated as much as possible. In the NLMS algorithm that is usually employed, it is preferable that the inverse attenuation constant τ in the range of 1.0001±0.0005. MIN{a, b} is a function which is used to compare a and b and output the smaller one. The output from the inverse peak hold circuit 62 is used to evaluate the degree of convergence of the estimated echo path 32. That is, the acoustic coupling estimation part 24 estimates that the larger the output from the inverse peak hold circuit 62, the higher the degree of convergence, and as in the FIG. 15 embodiment, the estimation part 24 detects the degree of convergence and measures the acoustic coupling G at that time and provides the measured value to the loss control circuit 21.

Figure 20:
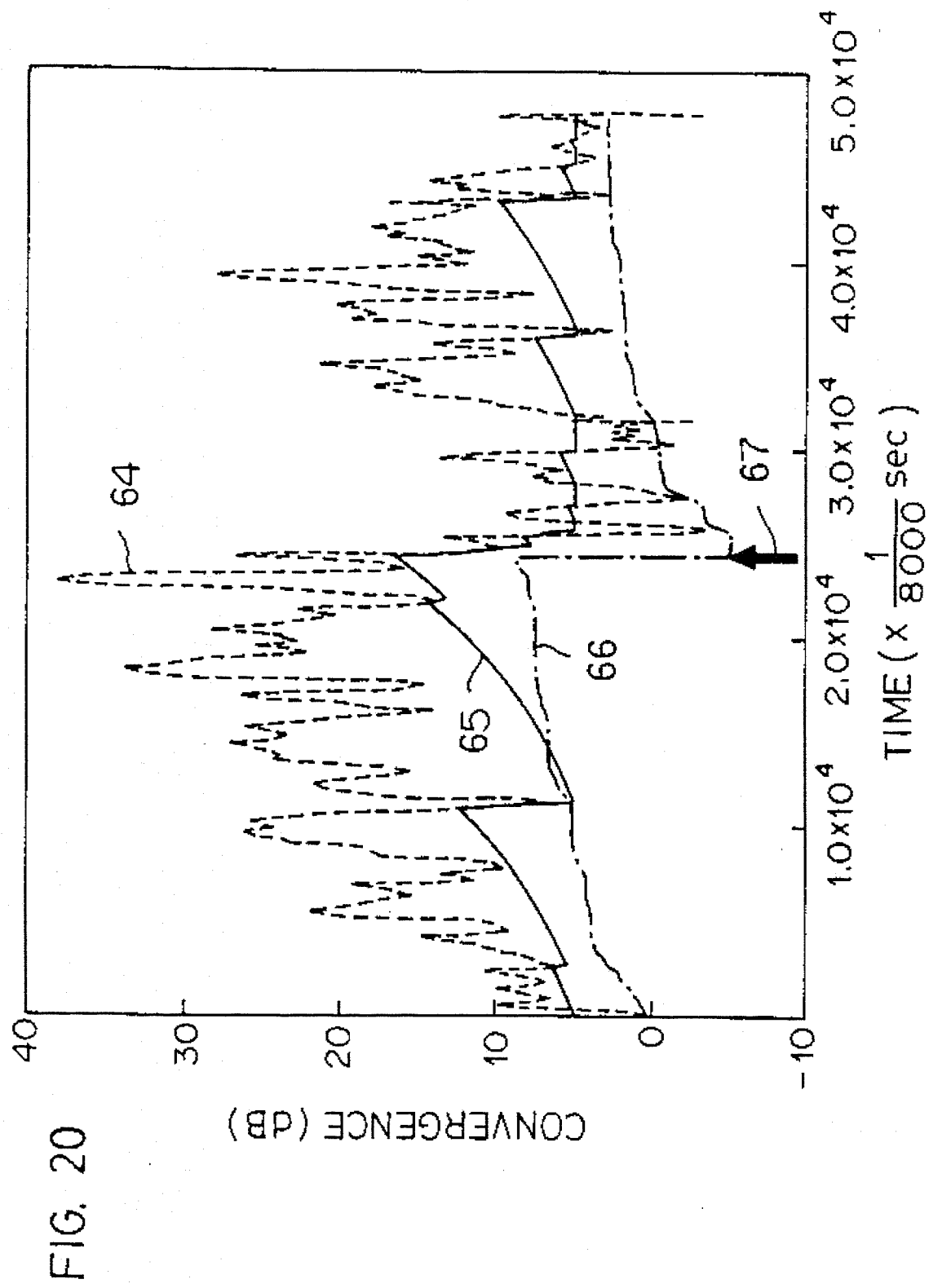
FIG. 20 is a graph showing convergence characteristics based on inverse peak hold values.

FIG. 20 is a graph showing the results of computer simulations performed to observe the effect of the inverse peak hold method on the convergence of the estimated echo path. The abscissa represents time and the ordinate a value indicating the degree of convergence of the estimated echo path 32 to the true one EP, the larger the value, the higher the degree of convergence. The broken line 64 indicates the power ratio, 10 log{Pu(k)/Pe(k)}, between the microphone output u(k) and the error signal e(k)—this has been used to evaluate the degree of convergence. The integration time used to calculate the power is short, because an extended integration time induces a time lag between the assessment of the degree of convergence and the actual one. The full line 65 indicates the inverse peak hold value NP(k) calculated in the inverse peak hold circuit 62. The inverse attenuation constant τ used was 1.0001 and the minimum value of the inverse peak hold value was 5 dB. The one-dot chain line 66 indicates the actual degree of convergence between the echo path EP and the estimated one 32 calculated by Eq. (40). The arrow 67 indicates the time when the echo path EP changed.

From FIG. 20 it will be seen that in the case of the conventional power comparison method (curve 64), the value representing the state of convergence may sometimes be large although the characteristic of the estimated echo path 32 is not approximate to that of the true echo path EP. For example, when the threshold value for convergence is set to a value above 10 dB, there is a fear of making a wrong decision. For example, after the time indicated by the arrow 67 the estimated echo path does not actually converge and the curve 65 remains below 10 dB, but the curve 64 exceeds 10 dB at some places; there is the possibility of misjudging the estimated echo path 32 as having converged. On the other hand, when the inverse peak hold method is used, the convergence (indicated by the curve 65) is less scattering and is close to the actual convergence (curve 65) of the estimated echo path 32 to the true one EP. Hence, it will be seen that as to the power comparison method, the inverse peak hold method permits more accurate evaluation of the true state of convergence of the estimated echo path 32 to the true one EP.

In this embodiment, since the inverse peak hold value is used to evaluate the state of convergence, the inverse peak hold circuit 62 holds an inverse peak value calculated under a poor convergence condition at the initial stage of convergence and raises the minimum value at about an expected convergence rate, discarding faster convergence as an error. Thus, the possibility of miscalculation of very fast convergence diminishes and the scatter of calculated values of convergence decreases accordingly. Besides, there are cases where a vowel or the like provides an apparently quick convergence although it does not actually converge, but according to the present invention, if convergence does occur at the beginning of the vowel, the value at that time is kept intact, and hence it is possible to calculate a convergence value close to the actual convergence, eliminating the possibility of misevaluation of convergence.

The inverse peak hold circuit 62 calculates and provides a power ratio of 10 logNP(k), for instance, to the state decision circuit 24A, which when the power ratio 10 log-NP(k) is above 15 dB, for instance, judges that the near-end speaker side loudspeaking system is in the receive single talk condition. The acoustic coupling determining part 24B measures the acoustic coupling at that time through the use of the powers PWx(k) and PWe(k).

In this embodiment which applies the inverse peak hold scheme to the echo canceller which is a combination of the echo cancelling part 30 and the adaptive loss control part 20, since the degree of convergence close to the actual one can be calculated as is evident from FIG. 20, it is possible to produce the same effect as is obtainable with the use of the peak hold circuit 52. As is the case with the peak hold technique, the inverse peak hold technique can be applied as well to the echo canceller which uses, in combination, the adaptive loss control part 20 and the FG/BG type echo cancelling part 30.

Figure 21:
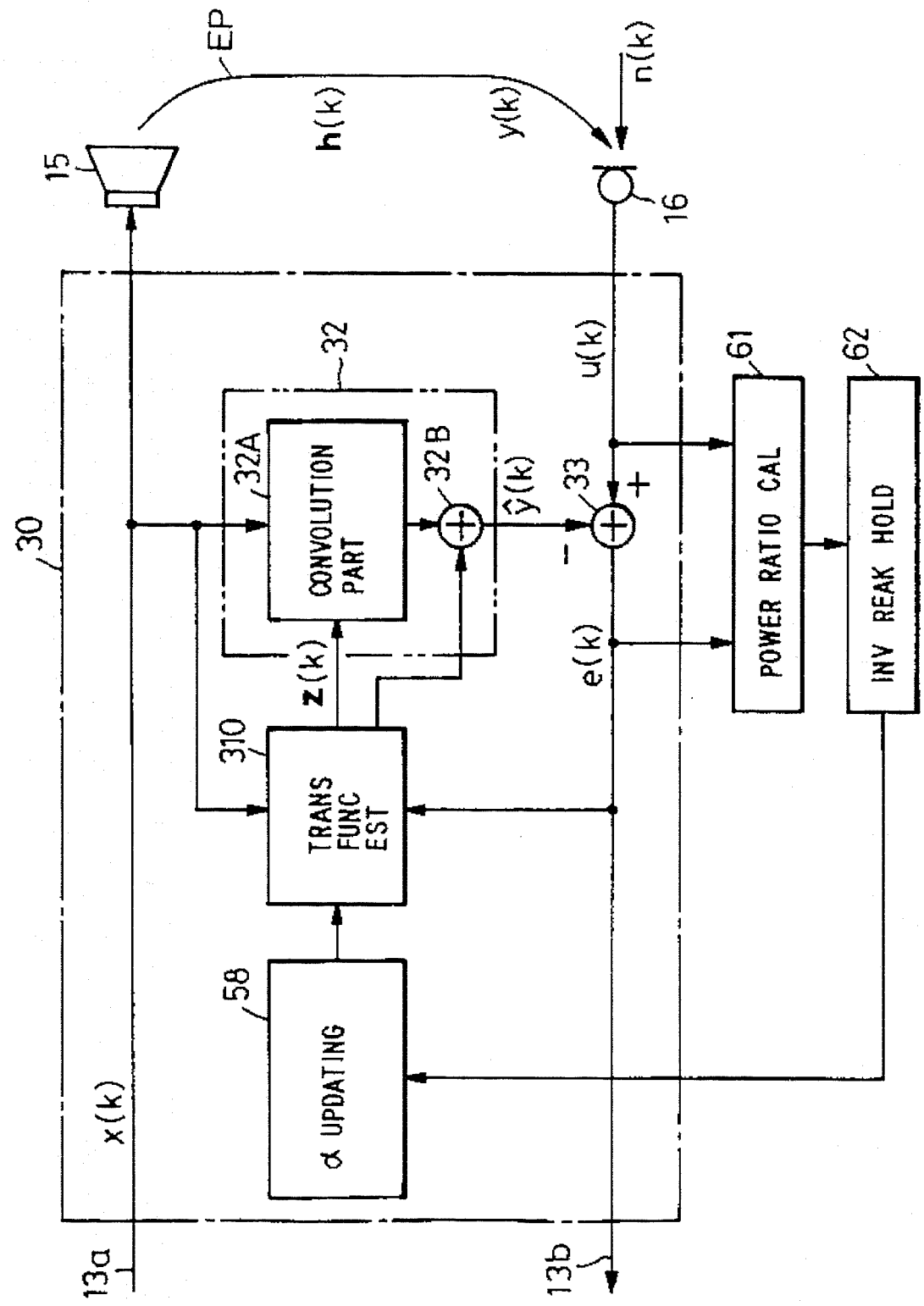
FIG. 21 is a block diagram illustrating another modified form of the FIG. 10 embodiment which is designed to change the step size on the basis of the inverse peak hold value.

FIG. 21 illustrates another embodiment of the present invention in which the inverse peak hold technique is combined with the adaptive algorithm for the echo path estimation of the echo canceller as in the case of FIG. 17. In FIG. 21 the parts corresponding to those in FIGS. 10 and 17 are denoted by the same reference numerals. As depicted in FIG. 20, also in the case of employing the inverse peak hold method, it is possible to calculate how much dBs the estimated echo path has converged so far, with an appreciably high degree of accuracy. In this embodiment, the output from the inverse peak hold circuit 62 is fed into the step size parameter changing part 58. As in the case of the FIG. 17 embodiment, when the output from the inverse peak hold circuit 62 and consequently the convergence value is below 10 dB, the step size parameter $\alpha$ is set to 1; when the convergence value is in the range from 10 to 15 dB, the step size parameter $\alpha$ is set to 0.5; and when the convergence value is above 15 dB, the step size parameter $\alpha$ is set to 0.1. The thus controlled step size parameter $\alpha$ is used as the step size $\alpha$ of the adaptive algorithm in the transfer function estimation part 310. As is the case with the FIG. 17 embodiment utilizing the peak hold scheme, the step size $\alpha$ can be changed, with the time-varying dispersion in the convergence value held small.

Figure 22:
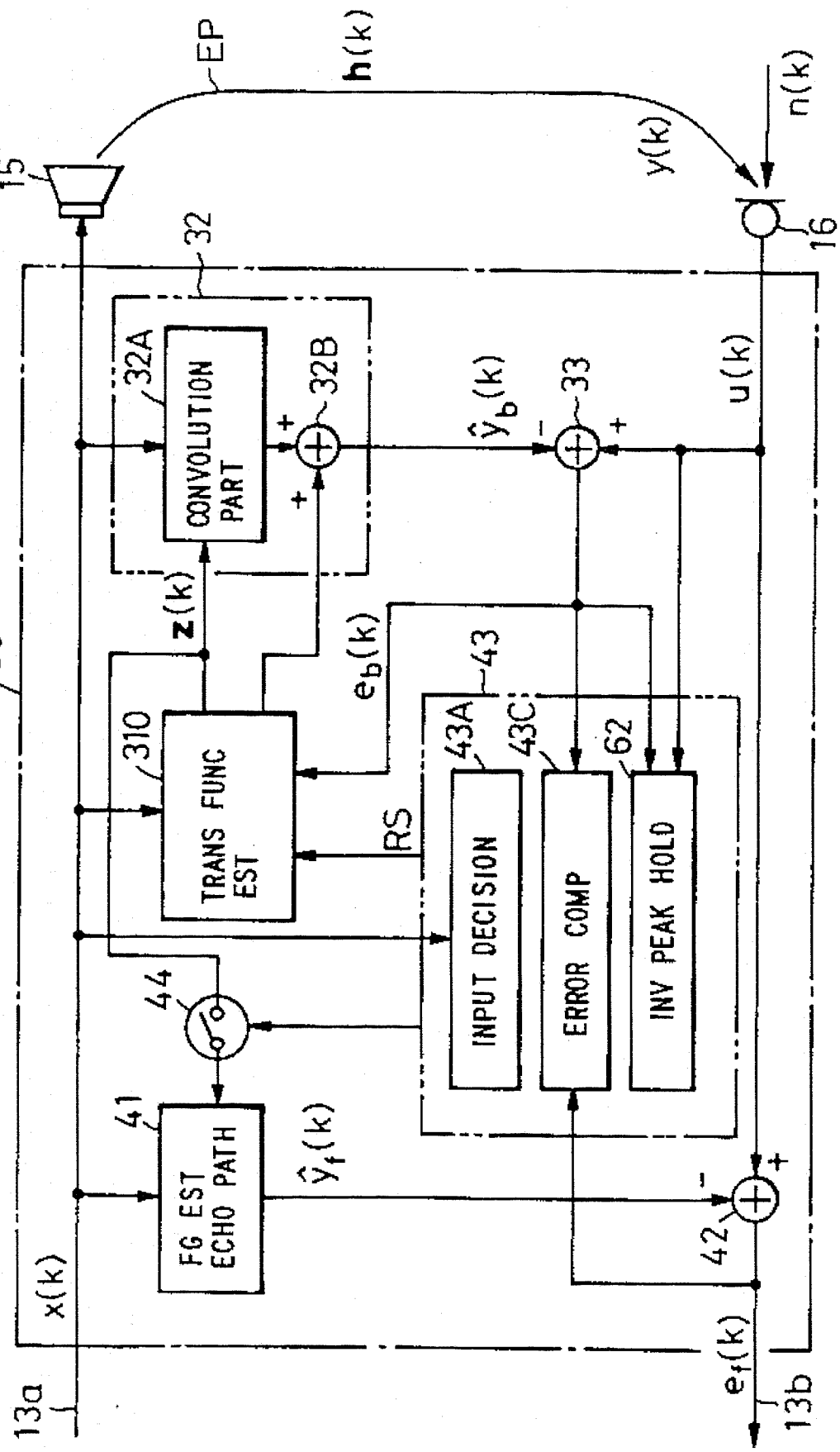
FIG. 22 is a block diagram illustrating another modified form of the FIG. 12 embodiment which is designed to judge the state of convergence on the basis of the inverse peak hold value.

FIG. 22 illustrates in block form still another embodiment which applies the inverse peak hold method to the FG/BG type echo canceller as in the FIG. 18 embodiment. In FIG. 22 the parts corresponding to those in FIGS. 7, 12 and 18 are identified by the same reference numerals. Of the three transfer conditions referred to previously with reference to the FG/BG systems of FIGS. 7 and 12, the condition that the power of the error signal $e_b(k)$ has become smaller than the power of the microphone output u(k) by a certain degree or more is replaced with a condition that the output from the inverse peak hold circuit 62 has exceeded a predetermined value. As described above in connection with FIG. 20, the inverse peak hold technique, compared with the mere power comparison method, permits accurate evaluation of the degree of convergence of the estimated echo path to the true one.

Also in the transfer function estimation part 310 in each of FIGS. 19 and 22, the step size parameter changing part 58 may be provided to change the step size $\alpha$ with the output from the inverse peak hold circuit 62.

As described above, in the embodiments of FIGS. 15, 17 and 18, an evaluation of the degree of convergence of the estimated echo path to the true one can be conducted with a higher degree of accuracy by comparing the moving peak hold value of the power of the microphone output u(k) and the moving peak hold value of the power of the error signal e(k) between the microphone output u(k) and the estimated echo signal ŷ(k) rather than by the mere power comparison. The same is true of the embodiments of FIGS. 19, 21 and 22 which utilize the inverse peak hold method.

By the application of the peak hold or inverse peak hold scheme to the echo canceller composed of the echo cancelling part 30 and the adaptive loss control part 20, the degree of echo cancellation in the echo cancelling part 30 can be calculated as a value close to the actual one—this permits accurate setting of the insertion loss, and hence leads to improvement of the speech transmission quality.

Furthermore, in the adaptive algorithm for the echo path estimation in which the step size parameter $\alpha$ is variable with the degree of echo cancellation, the step size parameter $\alpha$ can accurately be varied by using the moving peak hold values of the microphone output u(k) and the error signal e(k). This ensures full realization of the objective of the variable step size parameter type adaptive algorithm according to which when the coefficients of the estimated echo path has not converged, the step size parameter $\alpha$ is set to 1 to hasten the convergence and when the convergence has proceeded to some extent, the step size parameter $\alpha$ is set to a smaller value to reduce the ultimate steady ERLE. The use of the inverse peak hold method also produces the same effects as mentioned above.

Besides, the application of the peak hold or inverse peak hold method to the FG/BG echo canceller solves the problem of the conventional power comparison method that the BG side coefficient is erroneously transferred to the FG side; hence, the speech transmission quality is improved accordingly.

It will be apparent that many modifications and variations may be effected without departing from the scope of the novel concepts of the present invention.

What is claimed is:

1. An echo canceller of a fast projection algorithm for use in a system having a receiving transmission line and a sending transmission line linked via an echo path, said echo canceller comprising:

convolution means for producing an intermediate estimated echo signal through convolution of a received speech signal x(k) from said receiving transmission line and an intermediate variable z(k), k being an integer representing discrete time;

auto-correlation means for producing a p-order auto-correlation $r_{i,j}$ form said received speech signal x(k), i and j being integers that satisfy $0 \leq i \leq p-1$ and $0 \leq j \leq p-1$, respectively;

pre-filter coefficient calculating means for adaptively producing a pre-filter coefficient $\beta(k)$ from said auto-correlation and an error signal;

pre-filter coefficient smoothing means for producing a smoothed pre-filter coefficient s(k) by smoothing said pre-filter coefficient;

intermediate variable updating means for updating said intermediate variable z(k) through use of said smoothed pre-filter coefficient s(k) and said received speech signal x(k) and for providing said updated intermediate variable to said convolution means;

multiplying means for producing an inner product of said auto-correlation $r_{i,j}$ and said smoothed pre-filter coefficient s(k);

adding means for adding said inner product and said intermediate estimated echo signal from said convolution means and for outputting the result of said addition as an estimated echo signal y(k) for estimating an echo signal ŷ(k) which is the output from said echo path coupled to said sending transmission line;

subtracting means for subtracting said estimated echo signal ŷ(k) from a microphone output signal u(k) input into said sending transmission line to obtain an error signal e(k) and for applying said error signal e(k) to said pre-filter coefficient calculating means, said error signal e(k) being provided as a send signal to said sending transmission line;

reset signal generating means for comparing the magnitudes of said received speech signal x(k) and said error signal e(k) and for outputting a reset signal for at least a time duration p when the result of said comparison satisfies a predetermined condition; and reset means for resetting, in response to said reset signal, said pre-filter coefficient β(k) to be provided from said pre-filter coefficient calculating means to said pre-filter coefficient smoothing means to 0 for at least said time duration p.

2. An echo canceller of a fast projection algorithm for use in a system having a receiving transmission line and a sending transmission line linked via an echo path, said echo canceller comprising:

convolution means for producing an intermediate estimated echo signal through convolution of a received speech signal x(k) from said receiving transmission line and an intermediate variable z(k), k being an integer representing discrete time;

auto-correlation means for producing a p-order auto-correlation $r_{i,j}$ from said received speech signal x(k), i and j being integers that satisfy $0 \leq i \leq p-1$ and $0 \leq j \leq p-1$, respectively;

pre-filter coefficient calculating means for adaptively producing a pre-filter coefficient β(k) from said auto-correlation and an error signal;

pre-filter coefficient smoothing means for producing a smoothed pre-filter coefficient s(k) by smoothing said pre-filter coefficient;

intermediate variable updating means for updating said intermediate variable z(k) through use of said smoothed pre-filter coefficient s(k) and said received speech signal x(k) and for providing said updated intermediate variable to said convolution means;

multiplying means for producing an inner product of said auto-correlation $r_{i,j}$ and said smoothed pre-filter coefficient s(k);

adding means for adding said inner product and the output from said convolution means and for outputting the result of said addition as an estimated echo signal ŷ(k) for estimating an echo signal y(k) which is the output from said echo path coupled to said sending transmission line;

subtracting means for subtracting said estimated echo signal ŷ(k) from a microphone output signal u(k) input into said sending transmission line to obtain an error signal e(k) and for applying said error signal e(k) to said pre-filter coefficient calculating means;

estimated echo path means for producing convolution of a received speech signal x(k) and a given filter coefficient $\hat{h}_f(k)$ and for outputting said convolution as a second estimated echo signal $\hat{y}_f(k)$;

second subtracting means for subtracting said second estimated echo signal $\hat{y}_f(k)$ from said microphone output signal u(k) and for outputting the difference therebetween as a second error signal $e_f(k)$, said second error signal $e_f(k)$ being applied as a send signal to said sending transmission line;

transfer decision means which is supplied with said error signal e(k), said second error signal $e_f(k)$, said received speech signal x(k) and said microphone output signal u(k) and, when powers of the signals e(k), $e_f(k)$, x(k) and u(k) satisfy a predetermined condition, outputs a rest signal for a predetermined period of time, thereafter outputting a transfer instruction signal;

reset means responsive to said reset signal, for resetting said pre-filter coefficient β(k) to be provided from said pre-filter coefficient calculating means to said pre-filter coefficient smoothing means to 0 for at least a time duration p; and coefficient transfer means responsive to said transfer instruction signal, for transferring, as said filter coefficient $\hat{h}_f(k)$, said intermediate variable z(k) having been provided to said convolution means to said estimated echo path means.

3. The echo canceller of claim 1 or 2, further comprising: acoustic coupling estimating means supplied with said received speech signal x(k), said microphone output signal u(k) and said error signal e(k), for estimating, on the basis of magnitudes of said signals x(k), u(k) and e(k), acoustic coupling representing the degree to which said echo signal y(k) is contained in said microphone output signal u(k); and insertion loss control means for determining a loss to be inserted in one of said sending and receiving transmission lines on the basis of said estimated acoustic coupling so that the gain of a loop formed by said sending and receiving transmission lines and said echo path linking therebetween does not exceed 1, and for inserting said loss in one of said receiving and sending transmission lines.

4. The echo canceller of claim 3, wherein said acoustic coupling estimating means comprises: state decision means for deciding which of three states is present, namely a receive single-talk state in which said received speech signal x(k) is present and said estimated echo signal has converged, or a double-talk state in which a received signal is present and said estimated echo signal has not converged, or an echo path changing state in which a received signal is present and characteristics of said echo path have changed; and acoustic coupling determining means for calculating the acoustic coupling of said echo path on the basis of the results of said decision.

5. The echo canceller of claim 4, wherein said state decision means is means for deciding the presence or absence of a received signal on the basis of said received speech signal x(k) and for deciding, on the basis of said error signal e(k) and said microphone output signal u(k), whether said estimated echo signal ŷ(k) has been converged to said echo signal y(k) which is the output from said echo path.

6. The echo canceller of claim 4, wherein said state decision means is means which calculates the power of said received speech signal x(k), decides that a received signal is present when the calculated value is larger than a predetermined threshold value, and further decides, on the basis of said error signal e(k) and said microphone output signal u(k), whether said estimated echo signal ŷ(k) has been converged to said echo signal y(k) which is the output from said echo path.

7. The echo canceller of claim 4, wherein said state decision means is means which decides the presence or absence of a received signal on the basis of said received speech signal x(k), and when the powers of Pe(k) and Pu(k) of said error signal e(k) and said microphone output signal u(k) bear a relationship $Pe(k) < C_1 \cdot Pu(k)$, judges that said estimated echo signal ŷ(k) has converged to said echo signal y(k), $C_1$ being a predetermined positive constant equal to or smaller than 1.

8. The echo canceller of claim 5, wherein said state decision means decides that said echo path is changing if the powers Pe(k) and Pu(k) of said error signal e(k) and said microphone output signal u(k) bear a relationship Pe(k)>$C_2$.Pu(k) when said double-talk state is decided on the basis that said received signal is present and that said estimated echo signal ŷ(k) has not converged to said echo signal y(k), $C_2$ being a predetermined positive constant.

9. The echo canceller of claim 4, wherein when said state decision means decides the presence of said received single-talk state, said acoustic coupling determining means calculates the power ratio between said error signal and said microphone output signal as the acoustic coupling of said echo path and provides said power ratio to said loss control means.

10. The echo canceller of claim 9, wherein when said state decision means decides that said double-talk or echo path changing state is present, said acoustic coupling determining means calculates, as the acoustic coupling of said echo path, the ratio between powers of said error signal and said microphone output signal obtained by integrating the squares of said error signal and said microphone output signal for a predetermined period of time longer than the time over which said double-talk state is expected to last, said calculated acoustic coupling being provided to said loss control means.

11. The echo canceller of claim 9, wherein when said state decision means decides that said double-talk or echo path changing state is present, said acoustic coupling determining means calculates, as the acoustic coupling of said echo path, a value obtained by smoothing the power ratio between said error signal and said microphone output signal for a predetermined period of time, said calculated acoustic coupling being provided to said loss control means.

12. The echo canceller of claim 4, wherein when said state decision means decides that said receive single-talk state is present, said acoustic coupling determining means produces, as the acoustic coupling of said echo path, the ratio between powers of said error signal and said microphone output signal and provides said calculated acoustic coupling to said loss control means, and when said state decision means decides that said double-talk or echo changing state is present, said acoustic coupling determining means causes said loss control means to hold a loss set so far.

13. The echo canceller of claim 4, wherein when said state decision means decides that said receive single-talk state is present, said acoustic coupling determining means calculates, as the acoustic coupling of said echo path, the ratio between powers of said error signal and said microphone output signal and provides said calculated acoustic coupling to said loss control means; when said state decision means decides that said double-talk state is present, said acoustic coupling determining means causes said loss control means to hold a loss set so far; and when said state decision means decides that said echo path changing state is present, said acoustic coupling determining means causes said loss control means to set an initial loss.

14. The echo canceller of claim 1 or 2, further comprising: peak hold means supplied with said error signal e(k) and said microphone output signal u(k), for outputting a moving peak value of the power of said error signal and a moving peak value of the power of said microphone output signal; and step size changing means for calculating the degree of convergence of said estimated echo signal from said moving peak signals of said error signal and said microphone output signal and for changing an updating step size of said intermediate variable in said intermediate variable updating means in accordance with said calculated degree of convergence.

15. The echo canceller of claim 5, wherein said convergence decision means comprises: peak hold means supplied with said error signal e(k) and said microphone output signal u(k), for outputting a moving peak value of the power of said error signal and a moving peak value of the power of said microphone output signal; and means for deciding the degree of convergence of said estimated echo signal on the basis of said moving peak values of the powers of said error signal and said microphone output signals.

16. The echo canceller of claim 1 or 2, further comprising: power ratio calculating means supplied with said error signal e(k) and said microphone output signal u(k), for calculating the ratio between powers of said error signal and said microphone output signal; inverse peak hold means for outputting a moving inverse peak value of said power ratio as a signal representing the degree of convergence of said estimated echo path to said echo path; and step size changing means for changing an updating step size for said intermediate variable in said intermediate variable updating means.

17. The echo canceller of claim 5, wherein said convergence decision means comprises: power ratio calculating means supplied with said error signal and said microphone output signal, for calculating the ratio between powers of said error signal and said microphone output signal; and means for deciding the degree of convergence of said estimated echo signal on the basis of a moving inverse peak value of said power ratio.

18. The echo canceller of claim 2, further comprising: loss determining means responsive to said transfer instruction signal from said transfer decision means, for determining a loss to be inserted in one of said sending and receiving transmission lines on the basis of the magnitudes of said received speech signal x(k) and said second error signal $e_f(k)$ so that the gain of a loop formed by said sending and receiving transmission lines and said echo path linking therebetween does not exceed 1; and insertion loss control means for inserting said determined insertion loss in one of said receiving and sending transmission lines.

19. The echo canceller of claim 2, wherein said transfer decision means comprises: peak hold means supplied with said error signal e(k) and said microphone output signal u(k), for outputting a moving peak value of the power of said error signal and a moving peak value of the power of said microphone output signal; and means for deciding the degree of convergence of said estimated echo signal on the basis of said moving peak values of the powers of said error signal and said microphone output signals.

20. The echo canceller of claim 2, wherein said transfer decision means comprises: inverse peak hold means supplied with said error signal e(k) and said microphone output signal u(k), for calculating the ratio between powers of said error signal and said microphone output signal and producing a moving inverse peak value of said power ratio, and for deciding the degree of convergence of said estimated echo signal on the basis of said moving inverse peak value of said power ratio.

21. An echo cancelling method of a fast projection algorithm for use in a system having a receiving transmission line and a sending transmission line linked via an echo path, said method comprising the steps of:

(A) calculating a convolution x(k)z(k) of a received speech signal x(k) from said receiving transmission line and an intermediate variable z(k) by convolution means, where x(k) is a signal vector expressed by $[x(k), x(k-1), \ldots, x(k-L+1)]^T$, z(k) a signal vector expressed by $[z_1(k), z_2(k), \ldots, z_L(k)]^T$, L a tap coefficient of said convolution means which is equal to or greater than 3, and p a predetermined integer which satisfies $2 \leq p \leq L$;

(B) calculating from said received speech signal x(k) its p-order auto-correlation $r_{i,j}=x(k-i)^T x(k-j)$, where i and j are integers which satisfy $0 \leq i \leq p-1$ and $0 \leq j \leq p-1$, respectively;

(C) adaptively calculating a pre-filter coefficient β(k) from said auto-correlation and an error signal e(k) as a solution which satisfies the following simultaneous equations $$\beta(k)^T R(k) = [e(k), (1-\alpha)e(k-1), \ldots, (1-\alpha)^{p-1} e(k-p+1)]$$

where R(k) is an auto-correlation matrix with elements $r_{i,j}$, β(k) is a p-order pre-filter coefficient vector expressed by $[\beta_1(k), \beta_2(k), \ldots, \beta_p(k)]^T$, and α a positive step size equal to or smaller than 1;

(D) smoothing said pre-filter coefficient by the following equation to obtain a smoothed pre-filter coefficient $s_i(k)$, $$s_i(k) = s_{i-1}(k-1) + \beta_i(k), \; i=1, 2, \ldots, p, \text{ where } s_0(k)=0;$$

(E) generating said intermediate variable z(k) updated by the following equation through use of said smoothed pre-filter coefficient $s_i(k)$ and providing said updated intermediate variable to said convolution means as the filter coefficient thereof, $$z(k+1) = z(k) + \alpha s_p(k) x(k-p+1);$$

(F) calculating the inner product of said auto-correlation $r_{i,j}$ and said smoothed pre-filter coefficient $s_i(k)$;

(G) adding said inner product and the output from said convolution means and calculating the result of said addition as an estimated echo signal ŷ(k) which is used to estimate an echo signal y(k) which is the output from said echo path inter-connecting said receiving and sending transmission lines;

(H) subtracting said estimated echo signal ŷ(k) from a microphone output signal u(k) inputted into said sending transmission line to obtain an error signal e(k);

(I) comparing the magnitudes of said received speech signal x(k) and said error signal e(k) and, when the result of said comparison satisfied a predetermined condition, outputting a reset signal for at least a time duration p; and (J) resetting said pre-filter coefficient β(k) to zero for at least said time duration p in response to said reset signal.

22. The method of claim 21, further comprising the steps of:

(K) convoluting said received speech signal x(k) and a given filter coefficient ĥ(k) by second convolution means and outputting the result of said convolution as a second estimated echo signal $\hat{y}_f(k)$;

(L) subtracting said second estimated echo signal $\hat{y}_f(k)$ from said microphone output signal u(k) and outputting the difference as a second error signal $e_f(k)$, said second error signal $e_f(k)$ being provided as a send signal to said sending transmission line;

(M) receiving said error signal e(k), said second error signal $e_f(k)$, said received speech signal x(k) and said microphone output signal u(k), judging whether the signals e(k), $e_f(k)$, x(k) and u(k) satisfy a predetermined condition, and if so, outputting a reset signal for a predetermined period of time to set said pre-filter coefficient $\beta_f(k)$ to zero for said period, thereafter outputting a transfer instruction signal; and (N) responding to said transfer instruction signal to transfer said intermediate variable z(k) at that time as said filter coefficient $\hat{h}_f(k)$ to said second convolution means.

23. The method of claim 21 or 22, further comprising the steps of:

calculating an acoustic coupling representing the degree to which said echo signal is contained in said send signal, on the basis of the magnitudes of said microphone output signal u(k) and said error signal e(k); and determining a loss to be inserted in one of said sending and receiving transmission lines on the basis of said calculated acoustic coupling so that the gain of a loop formed by said receiving and sending transmission line and said echo path linking therebetween does not exceed 1, and inserting said determined loss in one of said receiving and sending transmission lines.

24. The method of claim 23, wherein said loss determining step includes the steps of: deciding which one of three states is satisfied, the state of either a receive single-talk state in which said received speech signal x(k) is present and said estimated echo signal has converged, a double-talk state in which a received signal is present and said estimated echo signal has not converged, or an echo path changing state in which a received signal is present and the characteristics of said echo path are changing; estimating the acoustic coupling of said echo path on the basis of the result of said state decision; and determining said insertion loss on the basis of said estimated acoustic coupling.

25. The method of claim 24, wherein said state decision step includes the steps of: deciding the presence or absence of a received signal on the basis of said received speech signal x(k); and deciding whether said estimated echo signal ŷ(k) has converged to said echo signal y(k) which is the output from said echo signal, on the basis of said error signal e(k) and said microphone output signal u(k).

26. The method of claim 25, wherein said step of deciding the presence or absence of said received signal is a step of calculating the power of said received speech signal x(k) and, when the calculated value is greater than a predetermined threshold value, deciding that said received signal is present.

27. The method of claim 25, wherein said convergence state deciding step is a step of deciding that said estimated echo signal ŷ(k) has converged to said echo signal y(k), if powers Pe(k) and Pu(k) of said error signal e(k) and said microphone output signal u(k) bear a relationship $Pe(k) < C_1 \cdot Pu(k)$, where $C_1$ is a predetermined positive constant equal to or greater than 1.

28. The method of claim 25, wherein said state decision step is a step of deciding that said echo path is changing if powers Pe(k) and Pu(k) of said error signal e(k) and said microphone output signal u(k) bear a relationship $Pe(k) > C_2 \cdot Pu(k)$ in said double-talk state in which it is decided that said received signal is present and said estimated echo signal has not converged to said echo signal y(k), $C_2$ being a predetermined positive constant.

29. The method of claim 24, wherein said loss determining step is a step wherein when the presence of said received single-talk state is decided in said state decision state, the ratio between powers of said error signal and said microphone output signal is calculated as the acoustic coupling of said echo path and said insertion loss is determined on the basis of said calculated power ratio.

30. The method of claim 29, wherein said loss determining step is a step wherein when the presence of said double-talk or echo path changing state is decided in said state decision step, the ratio between powers of said error signal and said microphone output signal, obtained by integrating the squares of said error signal and said microphone output signal for a predetermined period of time longer than the time over which said double-talk state is expected to last, is calculated as the acoustic coupling of said echo path and said insertion loss is determined on the basis of said calculated acoustic coupling.

31. The method of claim 29, wherein said loss determining step is a step wherein when the presence of said double-talk or echo path changing state is decided in said state decision step, a signal obtained by smoothing the ratio between powers of said error signal and said microphone output signal for a predetermined period of time is calculated as the acoustic coupling means of said echo path and said insertion loss is determined on the basis of said calculated acoustic coupling.

32. The method of claim 24, wherein said loss determining step is a step wherein when the presence of said receive single-talk state is decided in said state decision step, the ratio between powers of said error signal and said microphone output signal is calculated as the acoustic coupling of said echo path and said insertion loss is determined on the basis of said calculated acoustic coupling, and when the presence of said double-talk or echo path changing state is decided in said state decision step, the previous loss is held as said insertion loss.

33. The method of claim 24, wherein said loss determining step is a step wherein when the presence of said receive single-talk state is decided in said state decision step, the ratio between powers of said error signal and said microphone output signal is calculated as the acoustic coupling of said echo path and said insertion loss is determined on the basis of said calculated acoustic coupling; when the presence of said double-talk state is decided in said state decision step, the previous loss is held as said insertion loss; and when the presence of said echo path changing state is decided in said state decision step, an initial loss is used as said insertion loss.

34. The method of claim 21 or 22, further comprising the steps of: calculating a moving peak value of the power of said error signal $e(k)$ and a moving peak value of the power of said microphone output signal $u(k)$; calculating the degree of convergence of said estimated echo signal, from said moving peak values of said error signal and said microphone output signal; and changing a step size $\alpha$ for the updating of said intermediate variable in accordance with said calculated degree of convergence.

35. The method of claim 25, further comprising the steps of: calculating a moving peak value of the power of said error signal $e(k)$ and a moving peak value of the power of said microphone output signal $u(k)$; and deciding the degree of convergence of said estimated echo signal from said moving peak values of said error signal and said microphone output signal.

36. The method of claim 21 or 22, further comprising the steps of: calculating the ratio between powers of said error signal $e(k)$ and said microphone output signal $u(k)$; calculating a moving inverse peak value of said power ratio as a signal representing the degree of convergence of said estimated echo path to said echo path; and changing said intermediate variable updating step size $\alpha$ in accordance with said degree of convergence.

37. The method of claim 25, further comprising the steps of: calculating the ratio between powers of said error signal $e(k)$ and said microphone output signal $u(k)$; and deciding the degree of convergence of said estimated echo path to said echo path from a moving inverse peak value of said power ratio.

38. The method of claim 22, further comprising the step of responding to said transfer instruction signal to determine a loss to be inserted in one of said receiving and sending transmission lines on the basis of the magnitudes of said received speech signal $x(k)$ and said second error signal $e_f(k)$ so that the gain of a loop formed by said receiving and sending transmission lines and said echo path connected therebetween does not exceed 1, and then inserting said determined insertion loss in one of said receiving and sending transmission lines.

39. The method of claim 22, wherein said step of making a check to see if said predetermined condition is satisfied includes the steps of: holding a moving peak value of the power of said error signal and a moving peak value of the power of said microphone output signal; and deciding the degree of convergence of said estimated echo signal from said moving peak values.

40. The method of claim 22, wherein said step of making a check to see if said predetermined condition is satisfied includes the steps of: holding a moving inverse peak value of the power of said error signal $e(k)$ and a moving inverse peak value of the power of said microphone output signal $u(k)$; and deciding the degree of convergence of said estimated echo signal from said moving inverse peak values.

\* \* \* \* \*